(12) United States Patent
Kuriyama et al.

(10) Patent No.: US 9,436,032 B2
(45) Date of Patent: *Sep. 6, 2016

(54) LIQUID CRYSTAL DISPLAY DEVICE

(71) Applicant: DIC CORPORATION, Tokyo (JP)

(72) Inventors: Takeshi Kuriyama, Kita-adachi-gun (JP); Jouji Kawamura, Kita-adachi-gun (JP); Junichiro Koike, Sakura (JP); Hiroshi Maki, Sakura (JP); Masami Shishikura, Sakura (JP); Ryosuke Asami, Sakura (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/420,610

(22) PCT Filed: Dec. 24, 2013

(86) PCT No.: PCT/JP2013/084439
§ 371 (c)(1),
(2) Date: Feb. 9, 2015

(87) PCT Pub. No.: WO2015/097740
PCT Pub. Date: Jul. 2, 2015

(65) Prior Publication Data
US 2016/0054619 A1 Feb. 25, 2016

(51) Int. Cl.
*G01F 1/00* (2006.01)
*G02F 1/1335* (2006.01)
(Continued)

(52) U.S. Cl.
CPC ......... *G02F 1/133512* (2013.01); *C09K 19/20* (2013.01); *C09K 19/3066* (2013.01);
(Continued)

(58) Field of Classification Search
CPC ....................................................... G03F 7/11
See application file for complete search history.

(56) References Cited

U.S. PATENT DOCUMENTS 5,378,274 A  1/1995  Yokoyama et al.
5,831,701 A  11/1998  Matsuyama et al.
(Continued)

FOREIGN PATENT DOCUMENTS

CN    101790573 A    7/2010
CN    103069316 A    4/2013
(Continued)

OTHER PUBLICATIONS

International Search Report dated Feb. 25, 2014 issued in corresponding application No. PCT/JP2013/084439.
(Continued)

*Primary Examiner* — Chanceity Robinson
(74) *Attorney, Agent, or Firm* — Westerman, Hattori, Daniels & Adrian, LLP

(57) ABSTRACT

There is provided a liquid crystal display device that includes a liquid crystal composition and a color filter having a particular slope parameter that indicates the degree of aggregation of an organic pigment. The liquid crystal display device prevents a decrease in the voltage holding ratio (VHR) and an increase in the ion density (ID) in a liquid crystal layer and resolves the problems of display defects, such as white streaks, variations in alignment, and image sticking. The liquid crystal display device prevents a decrease in the voltage holding ratio (VHR) and an increase in the ion density (ID) in a liquid crystal layer and suppressing display defects such as image sticking. Therefore, the liquid crystal display device is useful for active matrix driving liquid crystal display devices with an IPS mode or an FFS mode and can be applied to liquid crystal display devices.

11 Claims, 2 Drawing Sheets

(51) Int. Cl.
*G02B 5/20* (2006.01)
*C09K 19/30* (2006.01)
*C09K 19/20* (2006.01)
C09K 19/04 (2006.01)
C09K 19/12 (2006.01)
C09K 19/34 (2006.01)

(52) U.S. Cl.
CPC ......... *G02B5/201* (2013.01); *G02F 1/133514* (2013.01); *C09K 2019/0466* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3009* (2013.01); *C09K 2019/3016* (2013.01); *C09K 2019/3019* (2013.01); *C09K 2019/3025* (2013.01); *C09K 2019/3422* (2013.01)

(56) References Cited

U.S. PATENT DOCUMENTS

| | | |
|---|---|---|
| 7,936,428 B2 | 5/2011 | Takahashi et al. |
| 2004/0017533 A1 | 1/2004 | Sumino |
| 2005/0190316 A1 | 9/2005 | Takahashi et al. |
| 2009/0162576 A1 | 6/2009 | Lee et al. |
| 2010/0309423 A1 | 12/2010 | Bernatz et al. |
| 2015/0232758 A1* | 8/2015 | Kuriyama .......... C09K 19/3001 349/86 |

FOREIGN PATENT DOCUMENTS

| | | |
|---|---|---|
| EP | 2 796 922 A1 | 10/2014 |
| JP | 09-043589 A | 2/1997 |
| JP | 2000-19321 A | 1/2000 |
| JP | 2000-019321 A | 1/2000 |
| JP | 2000-192040 A | 7/2000 |
| JP | 2009-192040 A | 7/2000 |
| JP | 2003295169 A | 10/2003 |
| JP | 2009-109542 A | 5/2009 |
| JP | 2010-537256 A | 12/2010 |
| JP | 2011-118139 A | 6/2011 |
| JP | 2012-032697 A | 2/2012 |
| JP | 2012068630 A | 4/2012 |
| JP | 2013-96944 A | 5/2013 |
| JP | 5273494 A1 | 8/2013 |
| JP | 5321932 B1 | 10/2013 |
| KR | 10-0286582 B1 | 1/2001 |
| KR | 10-2009-0068709 A | 6/2009 |

OTHER PUBLICATIONS

International Search Report dated Aug. 20, 2013, issued in International Application No. PCT/JP2013/066686. (2 pages), counterpart of U.S. Appl. No. 14/659,308.

* cited by examiner

LIQUID CRYSTAL DISPLAY DEVICE

TECHNICAL FIELD

The present invention relates to a liquid crystal display device.

BACKGROUND ART

Liquid crystal display devices have been used for clocks, calculators, household electric appliances, measuring instruments, panels for automobiles, word processors, electronic organizers, printers, computers, televisions, etc. Typical examples of a liquid crystal display mode include a TN (twisted nematic) mode, an STN (super twisted nematic) mode, a DS (dynamic scattering) mode, a GH (guest-host) mode, an IPS (in-plane switching) mode, an OCB (optically compensated birefringence) mode, an ECB (electrically controlled birefringence) mode, a VA (vertical alignment) mode, a CSH (color super-homeotropic) mode, and FLC (ferroelectric liquid crystal). The driving method has been changed from conventional static driving to multiplex driving, and passive matrix driving and, recently, active matrix (AM) driving performed using, for example, TFTs (thin film transistors) and TFDs (thin film diodes) have become the predominantly used driving method.

Referring to FIG. 1, a typical liquid crystal color display device includes two substrates (1) each having an alignment film (4), a transparent electrode layer (3a) serving as a common electrode and a color filter layer (2) which are disposed between one of the substrates and the alignment film of the one substrate, and a pixel electrode layer (3b) between the other substrate and the alignment film of that other substrate. The substrates are arranged so that the alignment films face each other and a liquid crystal layer (5) is sandwiched between the alignment films.

The color filter layer is constituted by a color filter that includes a black matrix, a red colored layer (R), a green colored layer (G), a blue colored layer (B), and, if needed, a yellow colored layer (Y).

Liquid crystal materials constituting such liquid crystal layers have been subjected to high levels of impurity control since impurities remaining in the materials significantly affect electrical properties of display devices. Regarding the materials that form alignment films, it has been known that the alignment films come into direct contact with the liquid crystal layer and impurities remaining in alignment films migrate to the liquid crystal layer, so that the impurities affect electrical properties of the liquid crystal layer. Studies are now being conducted in order to determine the properties of liquid crystal display devices affected by the impurities in the alignment film materials.

Materials, such as organic pigments, used in the color filter layer are also presumed to affect the liquid crystal layer due to impurities contained in the materials as with the case of the alignment film materials. However, since an alignment film and a transparent electrode are interposed between the color filter layer and the liquid crystal layer, the direct effects on the liquid crystal layer have been considered to be significantly low compared to those of the alignment film materials. However, alignment films are usually as thin as 0.1 µm or less in thickness. Transparent electrodes that serve as color-filter-layer-side common electrodes are thick so as to enhance the electrical conductivity; however, the thickness thereof is usually only as large as 0.5 µm or less. Accordingly, the color filter layer and the liquid crystal layer are not completely separated from each other. There is a possibility that impurities contained in the color filter layer may migrate through the alignment film and the transparent electrode and cause a decrease in the voltage holding ratio (VHR) and an increase in the ion density (ID) in the liquid crystal layer, thereby leading to display defects such as white streaks, variations in alignment, and image sticking.

Studies have been conducted to find a way to resolve display defects caused by impurities contained in pigments in color filters: a method of controlling release of impurities into liquid crystals by using a pigment in which the content of extracts obtained with ethyl formate is limited to a particular value or less (PTL 1) and a method of controlling release of impurities into liquid crystals by specifying the pigment in the blue colored layer (PTL 2). However, these methods do not differ much from simply decreasing the amounts of impurities in the pigment and fail to provide sufficient improvements that resolve the display defects even under the recent progress in pigment purification technologies.

Also disclosed are a method that focuses on the relationship between organic impurities contained in the color filter and a liquid crystal composition, in which insolubility of the organic impurities in the liquid crystal layer is indicated by a hydrophobicity parameter of liquid crystal molecules contained in the liquid crystal layer and the value of this hydrophobicity parameter is controlled to a particular value or higher and a method of preparing a liquid crystal composition that contains a particular fraction or more of a liquid crystal compound having a —$OCF_3$ group at an end of the liquid crystal molecule since there is a correlation between this hydrophobicity parameter and the —$OCF_3$ group at an end of a liquid crystal molecule (PTL 3).

However, the essence of the invention disclosed in this literature is to suppress effects of impurities in the pigment on the liquid crystal layer and thus a direct relationship between the structure of the liquid crystal material and the properties of the coloring material itself such as dyes and pigments used in the color filter has not been investigated. This literature does not resolve the problems related to display defects of liquid crystal display devices that have become sophisticated.

CITATION LIST

Patent Literature

PTL 1: Japanese Unexamined Patent Application Publication No. 2000-19321
PTL 2: Japanese Unexamined Patent Application Publication No. 2009-109542
PTL 3: Japanese Unexamined Patent Application Publication No. 2000-192040

SUMMARY OF INVENTION

Technical Problem

The present invention provides a liquid crystal display device that includes a particular liquid crystal composition and a color filter having a particular slope parameter that indicates the degree of aggregation of an organic pigment, to thereby prevent a decrease in the voltage holding ratio (VHR) and an increase in the ion density (ID) in the liquid crystal layer, and to resolve the problems of display defects, such as white streaks, variations in alignment, and image sticking.

Solution to Problem

The inventors of the present invention have extensively studied the combination of the color filter containing an organic pigment and the structure of the liquid crystal material constituting the liquid crystal layer to address the problems described above. As a result, the inventors have found that a liquid crystal display device that includes a particular liquid crystal material and a color filter having a particular slope parameter is capable of preventing a decrease in the voltage holding ratio (VHR) and an increase in the ion density (ID) in the liquid crystal layer and resolving the problems of display defects such as white streaks, variations in alignment, and image sticking. Thus, the inventors have completed the present invention.

That is, the present invention provides a liquid crystal display device including a first substrate, a second substrate, a liquid crystal composition layer sandwiched between the first substrate and the second substrate, a color filter constituted by a black matrix and at least RGB three-color pixel portions, a pixel electrode, and a common electrode, wherein the liquid crystal composition layer contains a liquid crystal composition that contains one or more compounds represented by general formula (I),

[Chem. 1]

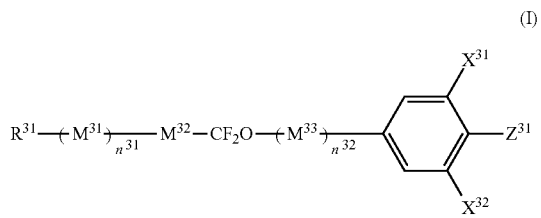

(I)

(in the formula, $R^{31}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group, one or two —$CH_2$— in the trans-1,4-cyclohexylene group may be substituted with —O— as long as oxygen atoms are not directly adjacent to each other, and one or two hydrogen atoms in the phenylene group may be substituted with fluorine atoms; $X^{31}$ and $X^{32}$ each independently represent a hydrogen atom or a fluorine atom; $Z^{31}$ represents a fluorine atom, a trifluoromethoxy group, or a trifluoromethyl group; $n^{31}$ and $n^{32}$ each independently represent 0, 1, or 2 and $n^{31}+n^{32}$ is 0, 1, or 2; and when a plurality of $M^{31}$ and $M^{33}$ are present, the plurality of $M^{31}$ may be the same or different and the plurality of $M^{33}$ may be the same or different) and that contains one or more compounds selected from the group consisting of compounds represented by general formula (II-a) to general formula (II-f),

[Chem. 2]

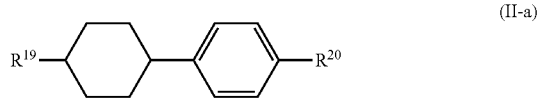

(II-a)

(II-b)

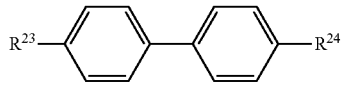

(II-c)

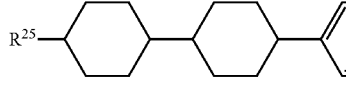

(II-d)

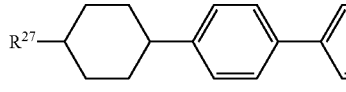

(II-e)

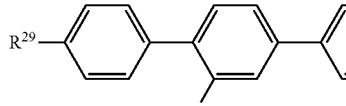

(II-f)

(in the formulae, $R^{19}$ to $R^{30}$ each independently represent an alkyl group having 1 to 10 carbon atoms, an alkoxy group having 1 to 10 carbon atoms, or an alkenyl group having 2 to 10 carbon atoms; and $X^{21}$ represents a hydrogen atom or a fluorine atom), the color filter is a color filter containing an organic pigment, and in a scattering profile analysis of the organic pigment in the color filter, the analysis including a step (A) of measuring an ultra-small angle X-ray profile of the organic pigment by ultra-small angle X-ray scattering, a step (B) of calculating a curve point on the scattering profile, a step (C) of calculating an analysis region (c1) set in accordance with the curve point, and a step (D) of calculating a slope parameter in the analysis region c1, the slope parameter in the analysis region (c1) is 2 or less.

Advantageous Effects of Invention

The liquid crystal display device according to the present invention includes a particular liquid crystal composition and a color filter having a particular slope parameter that indicates the degree of aggregation of an organic pigment, so that a decrease in the voltage holding ratio (VHR) and an increase in the ion density (ID) in the liquid crystal layer can be prevented and display defects such as white streaks, variations in alignment, and image sticking can be prevented.

Figure 1:
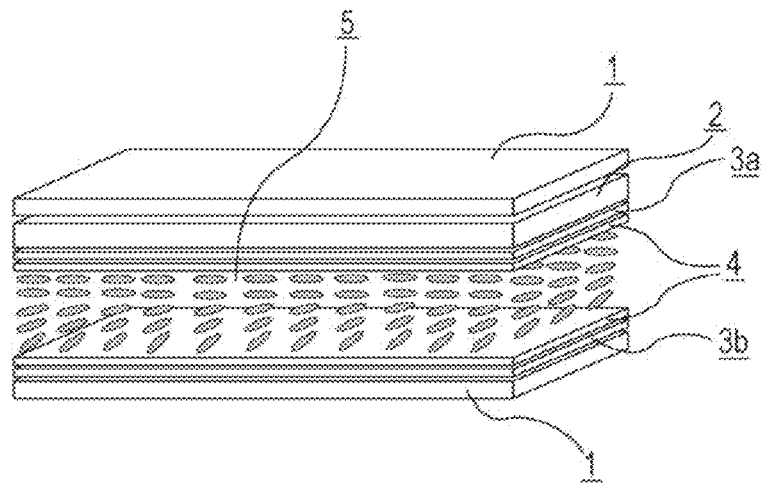
FIG. 1 is a diagram showing an example of a conventional typical liquid crystal display device.

REFERENCE SIGNS LIST 1 substrate
2 color filter layer
2a color filter layer having a particular slope parameter 3a transparent electrode layer (common electrode)
3b pixel electrode layer
4 alignment film
5 liquid crystal layer
5a liquid crystal layer containing a particular liquid crystal composition

DESCRIPTION OF EMBODIMENTS

Figure 2:
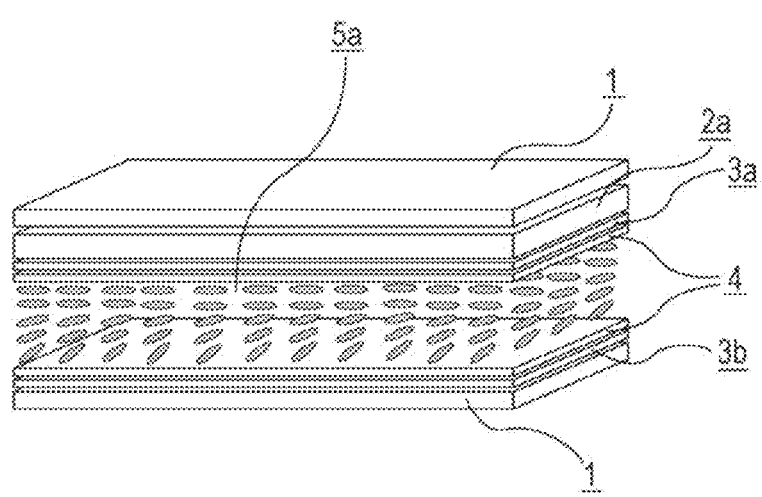
FIG. 2 is a diagram showing an example of a liquid crystal display device according to the present invention.

FIG. 2 shows an example of a liquid crystal display device according to the present invention. A transparent electrode layer (3a) that serves as a common electrode and a color filter layer (2a) that has a particular slope parameter are disposed between one of two substrates (1), i.e., a first substrate and a second substrate, each having an alignment film (4), and the alignment film of that one substrate. A pixel electrode layer (3b) is disposed between the other substrate and the alignment film of that substrate. These substrates are arranged so that the alignment films face each other and a liquid crystal layer (5a) containing a particular liquid crystal composition is sandwiched between the alignment films.

The two substrates of the display device are bonded to each other with a sealer and a sealing material disposed in the peripheral region. In most cases, granular spacers or resin spacer columns formed by photolithography are disposed between the two substrates to maintain the substrate-to-substrate distance.

(Liquid Crystal Layer)

A liquid crystal layer in a liquid crystal display device according to the present invention contains a liquid crystal composition that contains one or more compounds represented by general formula (I),

[Chem. 3]

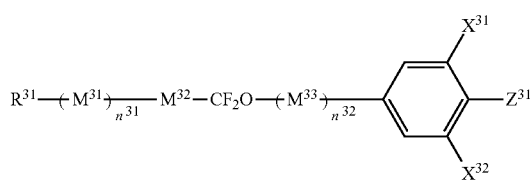
(I)

(in the formula, $R^{31}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group, one or two —$CH_2$— in the trans-1,4-cyclohexylene group may be substituted with —O— as long as oxygen atoms are not directly adjacent to each other, and one or two hydrogen atoms in the phenylene group may be substituted with fluorine atoms; $X^{31}$ and $X^{32}$ each independently represent a hydrogen atom or a fluorine atom; $Z^{31}$ represents a fluorine atom, a trifluoromethoxy group, or a trifluoromethyl group; $n^{31}$ and $n^{32}$ each independently represent 0, 1, or 2 and $n^{31}+n^{32}$ is 0, 1, or 2; and when a plurality of $M^{31}$ and $M^{33}$ are present, the plurality of $M^{31}$ may be the same or different and the plurality of $M^{33}$ may be the same or different) and that contains one or more compounds selected from the group consisting of compounds represented by general formula (II-a) to general formula (II-f),

[Chem. 4]

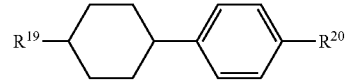
(II-a)

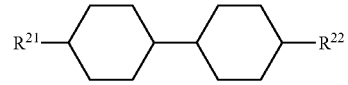
(II-b)

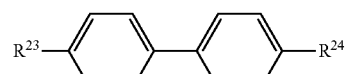
(II-c)

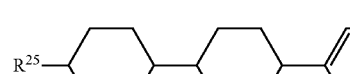
(II-d)

(II-e)

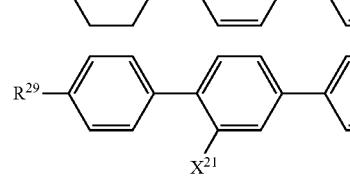
(II-f)

(in the formulae, $R^{19}$ to $R^{30}$ each independently represent an alkyl group having 1 to 10 carbon atoms, an alkoxy group having 1 to 10 carbon atoms, or an alkenyl group having 2 to 10 carbon atoms; and $X^{21}$ represents a hydrogen atom or a fluorine atom).

In the general formula (I), when the ring structure to which $R^{31}$ bonds is a phenyl group (aromatic group), $R^{31}$ preferably represents a linear alkyl group having 1 to 5 carbon atoms, a linear alkoxy group having 1 to 4 (or more) carbon atoms, or an alkenyl group having 4 or 5 carbon atoms. When the ring structure to which $R^{31}$ bonds is a saturated ring structure such as cyclohexane, pyran, or dioxane, $R^{31}$ preferably represents a linear alkyl group having 1 to 5 carbon atoms, a linear alkoxy group having 1 to 4 (or more) carbon atoms, or a linear alkenyl group having 2 to 5 carbon atoms.

When an importance is given to good chemical stability to heat and light, $R^{31}$ preferably represents an alkyl group. When an importance is given to production of a liquid crystal display element having high response speed due to low viscosity, $R^{31}$ preferably represents an alkenyl group. Furthermore, for the purpose of decreasing the viscosity, increasing the nematic-isotropic phase transition temperature (Tni), and further improving the response speed, an alkenyl group whose terminal bond is not an unsaturated bond is preferably used and an alkenyl group having a methyl group bonded to the terminal of the alkenyl group is particularly preferably used. When an importance is given to high solubility at low temperature, $R^{31}$ preferably represents an alkoxy group as one solution strategy. In another solution strategy, multiple types of $R^{31}$ are preferably used together. For example, $R^{31}$ is preferably a combination of compounds having alkyl groups or alkenyl groups having 2, 3, and 4 carbon atoms, a combination of compounds having alkyl groups or alkenyl groups having 3 and 5 carbon atoms, or a combination of compounds having alkyl groups or alkenyl groups having 3, 4, and 5 carbon atoms. $M^{31}$ to $M^{33}$ preferably have the following structures.

[Chem. 5]

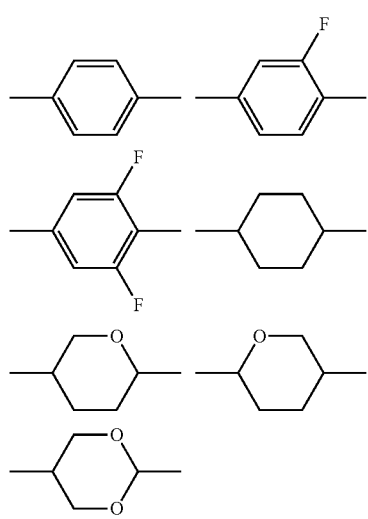

$M^{31}$ preferably has the following structures.

[Chem. 6]

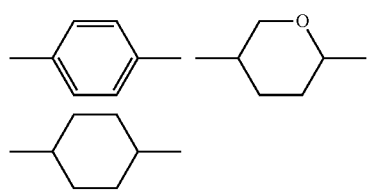

$M^{31}$ more preferably has the following structures.

[Chem. 7]

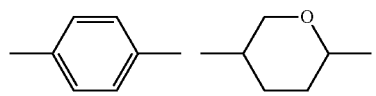

$M^{32}$ preferably has the following structures.

[Chem. 8]

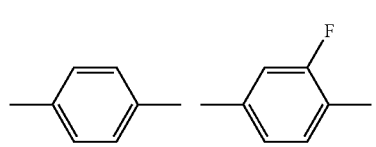

$M^{32}$ more preferably has the following structures.

[Chem. 9]

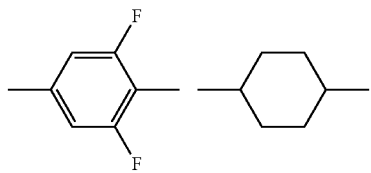

$M^{32}$ further preferably has the following structures.

[Chem. 10]

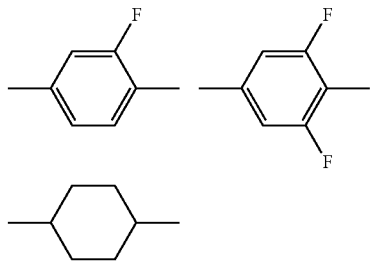

$M^{33}$ preferably has the following structures.

[Chem. 11]

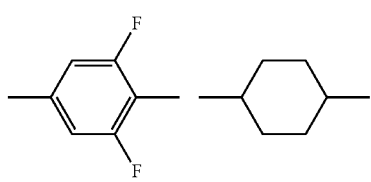

$M^{33}$ more preferably has the following structures.

[Chem. 12]

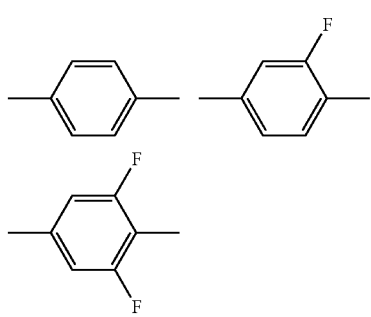

$M^{33}$ further preferably has the following structure.

[Chem. 13]

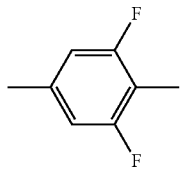

At least one of $X^{31}$ and $X^{32}$ preferably represents a fluorine atom and both of $X^{31}$ and $X^{32}$ more preferably represent fluorine atoms.

$Z^{31}$ preferably represents a fluorine atom or a trifluoromethoxy group.

Regarding the combination of $X^{31}$, $X^{32}$, and $Z^{31}$, in one embodiment, $X^{31}$=F, $X^{32}$=F, and $Z^{31}$=F. In another embodiment, $X^{31}$=F, $X^{32}$=H, and $Z^{31}$=F. In still another embodiment, $X^{31}$=F, $X^{32}$=H, and $Z^{31}$=OCF$_3$. In still another embodiment, $X^{31}$=F, $X^{32}$=F, and $Z^{31}$=OCF$_3$. In still another embodiment, $X^{31}$=H, $X^{32}$=H, and $Z^{31}$=OCF$_3$.

$n^{31}$ preferably represents 1 or 2, $n^{32}$ preferably represents 0 or 1 and more preferably 0, and $n^{31}$+$n^{32}$ preferably represents 1 or 2 and more preferably 2.

More specifically, the compounds represented by the general formula (I) are preferably compounds represented by general formula (I-a) to general formula (I-f) below.

[Chem. 14]

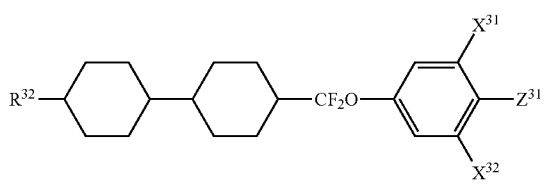
(I-a)

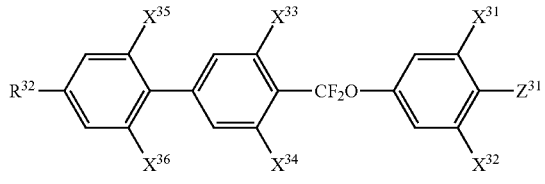
(I-b)

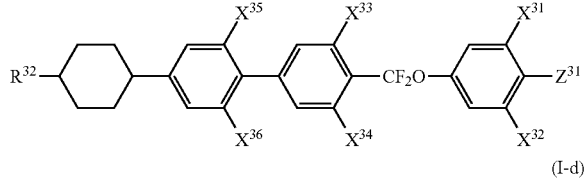
(I-c)

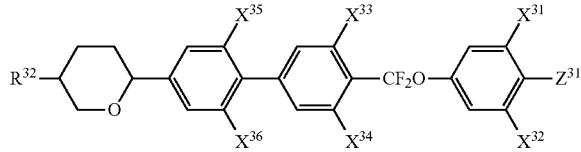
(I-d)

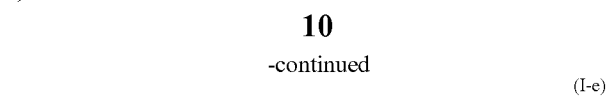
(I-e)

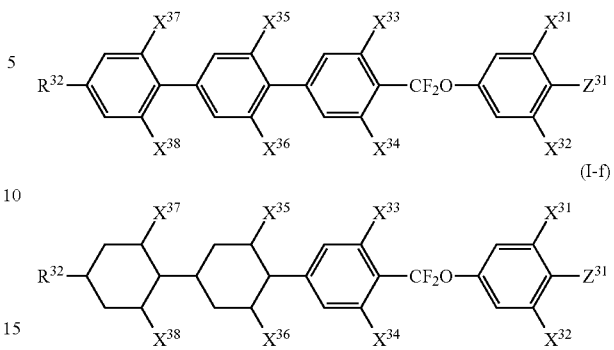
(I-f)

(In the formulae, $R^{32}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, $X^{31}$ to $X^{38}$ each independently represent a hydrogen atom or a fluorine atom, and $Z^{31}$ represents a fluorine atom, a trifluoromethoxy group, or a trifluoromethyl group.)

In the general formula (Ia) to the general formula (If), when the ring structure to which $R^{32}$ bonds is a phenyl group (aromatic group), $R^{32}$ preferably represents a linear alkyl group having 1 to 5 carbon atoms, a linear alkoxy group having 1 to 4 (or more) carbon atoms, or an alkenyl group having 4 or 5 carbon atoms. When the ring structure to which $R^{32}$ bonds is a saturated ring structure such as cyclohexane, pyran, or dioxane, $R^{32}$ preferably represents a linear alkyl group having 1 to 5 carbon atoms, a linear alkoxy group having 1 to 4 (or more) carbon atoms, or a linear alkenyl group having 2 to 5 carbon atoms.

When an importance is given to good chemical stability to heat and light, $R^{31}$ preferably represents an alkyl group. When an importance is given to production of a liquid crystal display element having high response speed due to low viscosity, $R^{31}$ preferably represents an alkenyl group. Furthermore, for the purpose of decreasing the viscosity, increasing the nematic-isotropic phase transition temperature (Tni), and further improving the response speed, an alkenyl group whose terminal bond is not an unsaturated bond is preferably used and an alkenyl group having a methyl group bonded to the terminal of the alkenyl group is particularly preferably used. When an importance is given to high solubility at low temperature, $R^{31}$ preferably represents an alkoxy group as one solution strategy. In another solution strategy, multiple types of $R^{31}$ are preferably used together. For example, $R^{31}$ is preferably a combination of compounds having alkyl groups or alkenyl groups having 2, 3, and 4 carbon atoms, a combination of compounds having alkyl groups or alkenyl groups having 3 and 5 carbon atoms, or a combination of compounds having alkyl groups or alkenyl groups having 3, 4, and 5 carbon atoms.

At least one of $X^{31}$ and $X^{32}$ preferably represents a fluorine atom and both of $X^{31}$ and $X^{32}$ more preferably represent fluorine atoms.

$Z^{31}$ preferably represents a fluorine atom or a trifluoromethoxy group.

Regarding the combination of $X^{31}$, $X^{32}$, and $Z^{31}$, in one embodiment, $X^{31}$=F, $X^{32}$=F, and $Z^{31}$=F. In another embodiment, $X^{31}$=F, $X^{32}$=H, and $Z^{31}$=F. In still another embodiment, $X^{31}$=F, $X^{32}$=H, and $Z^{31}$=OCF$_3$. In still another embodiment, $X^{31}$=F, $X^{32}$=F, and $Z^{31}$=OCF$_3$. In still another embodiment, $X^{31}$=H, $X^{32}$=H, and $Z^{31}$=OCF$_3$.

$n^{31}$ preferably represents 1 or 2, $n^{32}$ preferably represents 0 or 1 and more preferably 0, and $n^{31}+n^{32}$ preferably represents 1 or 2 and more preferably 2.

At least one of $X^{33}$ and $X^{34}$ preferably represents a fluorine atom and both of $X^{33}$ and $X^{34}$ more preferably represent fluorine atoms.

At least one of $X^{35}$ and $X^{36}$ preferably represents a fluorine atom. However, it is not preferred that both of $X^{35}$ and $X^{36}$ represent fluorine atoms in view of Tni, solubility at low temperature, and chemical stability in the form of a liquid crystal display element, though there is a good effect when $\Delta\in$ is increased.

At least one of $X^{37}$ and $X^{38}$ preferably represents a hydrogen atom and both of $X^{37}$ and $X^{38}$ more preferably represent hydrogen atoms. It is not preferred that at least one of $X^{37}$ and $X^{38}$ represent a fluorine atom in view of Tni, solubility at low temperature, and chemical stability in the form of a liquid crystal display element.

One to eight of the compounds represented by the general formula (I) are preferably contained, and one to five of the compounds are particularly preferably contained. The content of the compounds is preferably 3 to 50 mass % and more preferably 5 to 40 mass %.

In the general formula (IIa) to the general formula (IIf), when the ring structure to which each of $R^{19}$ to $R^{30}$ bonds is a phenyl group (aromatic group), each of $R^{19}$ to $R^{30}$ preferably represents a linear alkyl group having 1 to 5 carbon atoms, a linear alkoxy group having 1 to 4 (or more) carbon atoms, or an alkenyl group having 4 or 5 carbon atoms. When the ring structure to which each of $R^{19}$ to $R^{30}$ bonds is a saturated ring structure such as cyclohexane, pyran, or dioxane, each of $R^{19}$ to $R^{30}$ preferably represents a linear alkyl group having 1 to 5 carbon atoms, a linear alkoxy group having 1 to 4 (or more) carbon atoms, or a linear alkenyl group having 2 to 5 carbon atoms.

When an importance is given to good chemical stability to heat and light, each of $R^{19}$ to $R^{30}$ preferably represents an alkyl group. When an importance is given to production of a liquid crystal display element having high response speed due to low viscosity, each of $R^{19}$ to $R^{30}$ preferably represents an alkenyl group. Furthermore, for the purpose of decreasing the viscosity, increasing the nematic-isotropic phase transition temperature (Tni), and further improving the response speed, an alkenyl group whose terminal bond is not an unsaturated bond is preferably used and an alkenyl group having a methyl group bonded to the terminal of the alkenyl group is particularly preferably used. When an importance is given to high solubility at low temperature, each of $R^{19}$ to $R^{30}$ preferably represents an alkoxy group as one solution strategy. In another solution strategy, multiple types of $R^{19}$ to $R^{30}$ are preferably used together. For example, each of $R^{19}$ to $R^{30}$ is preferably a combination of compounds having alkyl groups or alkenyl groups having 2, 3, and 4 carbon atoms, a combination of compounds having alkyl groups or alkenyl groups having 3 and 5 carbon atoms, or a combination of compounds having alkyl groups or alkenyl groups having 3, 4, and 5 carbon atoms.

$R^{19}$ and $R^{20}$ preferably represent an alkyl group or an alkoxy group and at least one of $R^{19}$ and $R^{20}$ preferably represents an alkoxy group. More preferably, $R^{19}$ represents an alkyl group and $R^{20}$ represents an alkoxy group. Further preferably, $R^{19}$ represents an alkyl group having 3 to 5 carbon atoms and $R^{20}$ represents an alkoxy group having 1 or 2 carbon atoms.

$R^{21}$ and $R^{22}$ preferably represent an alkyl group or an alkenyl group and at least one of $R^{21}$ and $R^{22}$ preferably represents an alkenyl group. A compound in which both $R^{21}$ and $R^{22}$ are alkenyl groups is suitably used to improve the response speed, but is not preferred in the case where the chemical stability of a liquid crystal display element is improved.

At least one of $R^{23}$ and $R^{24}$ preferably represents an alkyl group having 1 to 5 carbon atoms, an alkoxy group having 1 to 5 carbon atoms, or an alkenyl group having 4 or 5 carbon atoms. To achieve good balance between response speed and Tni, at least one of $R^{23}$ and $R^{24}$ preferably represents an alkenyl group. To achieve good balance between response speed and solubility at low temperature, at least one of $R^{23}$ and $R^{24}$ preferably represents an alkoxy group.

At least one of $R^{25}$ and $R^{26}$ preferably represents an alkyl group having 1 to 5 carbon atoms, an alkoxy group having 1 to 5 carbon atoms, or an alkenyl group having 2 to 5 carbon atoms. To achieve a good balance between response speed and Tni, at least one of $R^{25}$ and $R^{26}$ preferably represents an alkenyl group. To achieve a good balance between response speed and solubility at low temperature, at least one of $R^{25}$ and $R^{26}$ preferably represents an alkoxy group. More preferably, $R^{25}$ represents an alkenyl group and $R^{26}$ represents an alkyl group. It is also preferred that $R^{25}$ represent an alkyl group and $R^{26}$ represent an alkoxy group.

At least one of $R^{27}$ and $R^{28}$ preferably represents an alkyl group having 1 to 5 carbon atoms, an alkoxy group having 1 to 5 carbon atoms, or an alkenyl group having 2 to 5 carbon atoms. To achieve a good balance between response speed and Tni, at least one of $R^{27}$ and $R^{28}$ preferably represents an alkenyl group. To achieve a good balance between response speed and solubility at low temperature, at least one of $R^{27}$ and $R^{28}$ preferably represents an alkoxy group. More preferably, $R^{27}$ represents an alkyl group or an alkenyl group and $R^{28}$ represents an alkyl group. It is also preferred that $R^{27}$ represent an alkyl group and $R^{28}$ represent an alkoxy group. Furthermore, it is particularly preferred that $R^{27}$ represent an alkyl group and $R^{28}$ represent an alkyl group.

$X^{21}$ is preferably a fluorine atom.

At least one of $R^{29}$ and $R^{30}$ preferably represents an alkyl group having 1 to 5 carbon atoms or an alkenyl group having 4 or 5 carbon atoms. To achieve a good balance between response speed and Tni, at least one of $R^{29}$ and $R^{30}$ preferably represents an alkenyl group. To achieve good reliability, at least one of $R^{29}$ and $R^{30}$ preferably represents an alkyl group. More preferably, $R^{29}$ represents an alkyl group or an alkenyl group and $R^{30}$ represents an alkyl group or an alkenyl group. It is also preferred that $R^{29}$ represent an alkyl group and $R^{30}$ represent an alkenyl group. Furthermore, it is also preferred that $R^{29}$ represent an alkyl group and $R^{30}$ represent an alkyl group.

One to ten of the compounds represented by the general formula (II-a) to the general formula (II-f) are preferably contained, and one to eight of the compounds are particularly preferably contained. The content of the compounds is preferably 5 to 80 mass %, more preferably 10 to 70 mass %, and particularly preferably 20 to 60 mass %.

A liquid crystal composition layer in a liquid crystal display device according to the present invention may further contain one or more compounds selected from the group consisting of compounds represented by general formula (III-a) to general formula (III-f).

[Chem. 15]

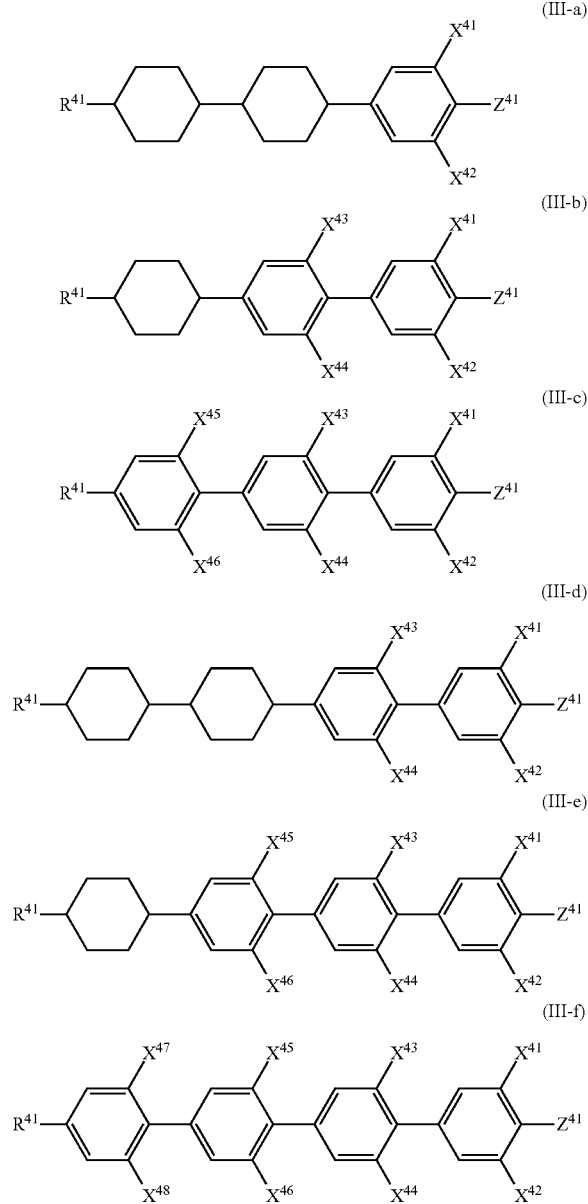

(In the formulae, $R^{41}$ represents an alkyl group having 1 to 10 carbon atoms, an alkoxy group having 1 to 10 carbon atoms, or an alkenyloxy group having 2 to 10 carbon atoms, $X^{41}$ to $X^{48}$ each independently represent a hydrogen atom or a fluorine atom, and $Z^{41}$ represents a fluorine atom, a trifluoromethoxy group, or a trifluoromethyl group.)

In the general formula (IIIa) to the general formula (IIIf), when the ring structure to which $R^{41}$ bonds is a phenyl group (aromatic group), $R^{41}$ preferably represents a linear alkyl group having 1 to 5 carbon atoms, a linear alkoxy group having 1 to 4 (or more) carbon atoms, or an alkenyl group having 4 or 5 carbon atoms. When the ring structure to which $R^{41}$ bonds is a saturated ring structure such as cyclohexane, pyran, or dioxane, $R^{41}$ preferably represents a linear alkyl group having 1 to 5 carbon atoms, a linear alkoxy group having 1 to 4 (or more) carbon atoms, or a linear alkenyl group having 2 to 5 carbon atoms.

When an importance is given to good chemical stability to heat and light, $R^{41}$ preferably represents an alkyl group. When an importance is given to production of a liquid crystal display element having high response speed due to low viscosity, $R^{41}$ preferably represents an alkenyl group. Furthermore, for the purpose of decreasing the viscosity, increasing the nematic-isotropic phase transition temperature (Tni), and further improving the response speed, an alkenyl group whose terminal bond is not an unsaturated bond is preferably used and an alkenyl group having a methyl group bonded to the terminal of the alkenyl group is particularly preferably used. When an importance is given to high solubility at low temperature, $R^{41}$ preferably represents an alkoxy group as one solution strategy. In another solution strategy, multiple types of $R^{41}$ are preferably used together. For example, $R^{41}$ is preferably a combination of compounds having alkyl groups or alkenyl groups having 2, 3, and 4 carbon atoms, a combination of compounds having alkyl groups or alkenyl groups having 3 and 5 carbon atoms, or a combination of compounds having alkyl groups or alkenyl groups having 3, 4, and 5 carbon atoms.

At least one of $X^{41}$ and $X^{42}$ preferably represents a fluorine atom and both of $X^{41}$ and $X^{42}$ more preferably represent fluorine atoms.

$Z^{41}$ preferably represents a fluorine atom or a trifluoromethoxy group.

Regarding the combination of $X^{41}$, $X^{42}$, and $Z^{41}$, in one embodiment, $X^{41}$=F, $X^{42}$=F, and $Z^{41}$=F. In another embodiment, $X^{41}$=F, $X^{42}$=H, and $Z^{41}$=F. In still another embodiment, $X^{41}$=F, $X^{42}$=H, and $Z^{41}$=OCF$_3$. In still another embodiment, $X^{41}$=F, $X^{42}$=F, and $Z^{41}$=OCF$_3$. In still another embodiment, $X^{41}$=H, $X^{42}$=H, and $Z^{41}$=OCF$_3$.

At least one of $X^{43}$ and $X^{44}$ preferably represents a fluorine atom and both of $X^{43}$ and $X^{44}$ preferably represent fluorine atoms to increase $\Delta\in$. However, it is not preferred that both of $X^{43}$ and $X^{44}$ represent fluorine atoms in terms of improvement in solubility at low temperature.

At least one of $X^{45}$ and $X^{46}$ preferably represents a hydrogen atom and both of $X^{45}$ and $X^{46}$ more preferably represent hydrogen atoms. The use of fluorine atoms in a large amount is not preferred in view of Tni, solubility at low temperature, and chemical stability in the form of a liquid crystal display element.

At least one of $X^{47}$ and $X^{48}$ preferably represents a hydrogen atom and both of $X^{47}$ and $X^{48}$ more preferably represent hydrogen atoms. It is not preferred that at least one of $X^{47}$ and $X^{48}$ represent a fluorine atom in view of Tni, solubility at low temperature, and chemical stability in the form of a liquid crystal display element.

One to ten of the compounds selected from the group consisting of the compounds represented by the general formula (III-a) to the general formula (III-f) are preferably contained and one to eight of the compounds are more preferably contained. The content of the compounds is preferably 5 to 50 mass % and more preferably 10 to 40 mass %.

In the liquid crystal composition of the liquid crystal composition layer in the liquid crystal display device according to the present invention, $\Delta\in$ at 25° C. is preferably +1.5 or more. In order to achieve high response speed, $\Delta\in$ at 25° C. is preferably +1.5 to +4.0 and more preferably +1.5 to +3.0. In order to achieve low-voltage driving, $\Delta\in$ at 25° C. is preferably +8.0 to +18.0 and more preferably +10.0 to +15.0. Furthermore, $\Delta$n at 25° C. is preferably 0.08 to 0.14 and more preferably 0.09 to 0.13. More specifically, $\Delta$n is preferably 0.10 to 0.13 when a small cell gap is employed and 0.08 to 0.10 when a large cell gap is employed.

Moreover, η at 20° C. is preferably 5 to 45 mPa·s, more preferably 5 to 25 mPa·s, and particularly preferably 10 to 20 mPa·s. $T_{ni}$ is preferably 60° C. to 120° C., more preferably 70° C. to 100° C., and particularly preferably 70° C. to 85° C.

In addition to the above compounds, the liquid crystal composition in the present invention may contain typical nematic liquid crystal, smectic liquid crystal, and cholesteric liquid crystal.

The liquid crystal composition according to the present invention may contain at least one polymerizable compound for the purpose of producing a liquid crystal display element with, for example, a PS mode, a transverse electric field-type PSA mode, or a transverse electric field-type PSVA mode. For example, a photopolymerizable monomer whose polymerization proceeds with energy rays such as light can be used as the polymerizable compound. In terms of structure, a polymerizable compound having a liquid crystal skeleton formed by bonding a plurality of six-membered rings, such as a biphenyl derivative or a terphenyl derivative, is exemplified. More specifically, the polymerizable compound is preferably a bifunctional monomer represented by general formula (V).

[Chem. 16]

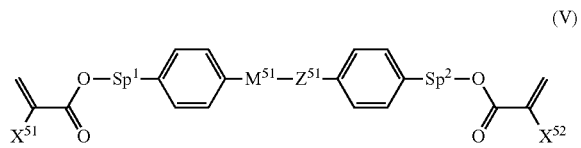

(V)

(In the formula, $X^{51}$ and $X^{52}$ each independently represent a hydrogen atom or a methyl group and $Sp^1$ and $Sp^2$ each independently represent a single bond, an alkylene group having 1 to 8 carbon atoms, or —O—$(CH_2)_s$— (where s represents an integer of 2 to 7 and the oxygen atom bonds to an aromatic ring); $Z^{51}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (where $Y^1$ and $Y^2$ each independently represent a fluorine atom or a hydrogen atom), —C≡C—, or a single bond; and $M^{51}$ represents a 1,4-phenylene group, a trans-1,4-cyclohexylene group, or a single bond and, in all the 1,4-phenylene groups in the general formula, any of hydrogen atoms may be substituted with fluorine atoms.)

The polymerizable compound is preferably any of a diacrylate derivative in which $X^{51}$ and $X^{52}$ each represent a hydrogen atom and a dimethacrylate derivative in which $X^{51}$ and $X^{52}$ each represent a methyl group, and is also preferably a compound in which one of $X^{51}$ and $X^{52}$ represents a hydrogen atom and the other represents a methyl group. Among these compounds, the diacrylate derivative has the highest rate of polymerization, the dimethacrylate derivative has a low rate of polymerization, and the asymmetrical compound has an intermediate rate of polymerization. A preferred one can be used in accordance with the applications. In a PSA display element, the dimethacrylate derivative is particularly preferably used.

$Sp^1$ and $Sp^2$ each independently represent a single bond, an alkylene group having 1 to 8 carbon atoms, or —O—$(CH_2)_s$—. In a PSA display element, at least one of $Sp^1$ and $Sp^2$ preferably represents a single bond. A compound in which $Sp^1$ and $Sp^2$ each represent a single bond or a compound in which one of $Sp^1$ and $Sp^2$ represents a single bond and the other represents an alkylene group having 1 to 8 carbon atoms or —O—$(CH_2)_s$— is preferred. In this case, an alkyl group having 1 to 4 carbon atoms is preferred and s is preferably 1 to 4.

$Z^{51}$ preferably represents —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably represents —COO—, —OCO—, or a single bond, and particularly preferably represents a single bond.

$M^{51}$ represents a 1,4-phenylene group in which any of hydrogen atoms may be substituted with fluorine atoms, a trans-1,4-cyclohexylene group, or a single bond and preferably represents the 1,4-phenylene group or a single bond. When C represents a ring structure other than a single bond, $Z^{51}$ preferably represents a linking group other than a single bond. When $M^{51}$ represents a single bond, $Z^{51}$ preferably represents a single bond.

In view of the foregoing, the ring structure between $Sp^1$ and $Sp^2$ in the general formula (V) is preferably the following structure.

In the case where $M^{51}$ represents a single bond and the ring structure is constituted by two rings in the general formula (V), the ring structure is preferably represented by formula (Va-1) to formula (Va-5) below, more preferably represented by formula (Va-1) to formula (Va-3), and particularly preferably represented by formula (Va-1).

[Chem. 17]

(Va-1)

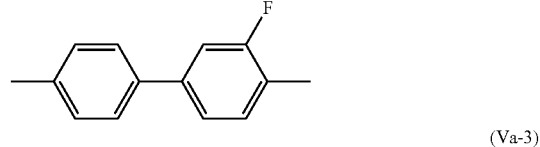

(Va-2)

(Va-3)

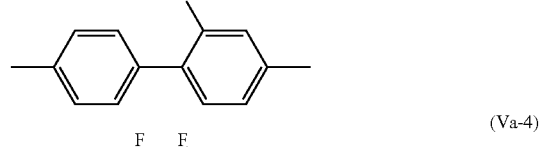

(Va-4)

(Va-5)

(In the formulae, both ends bond to $Sp^1$ and $Sp^2$.)

The anchoring strength after the polymerization of the polymerizable compound having such a skeleton is suitable for PSA-type liquid crystal display elements, and a good alignment state is achieved. Therefore, the display unevenness is suppressed or completely prevented.

Accordingly, the polymerizable compound is particularly preferably represented by general formula (V-1) to general formula (V-4) and most preferably represented by general formula (V-2).

[Chem. 18]

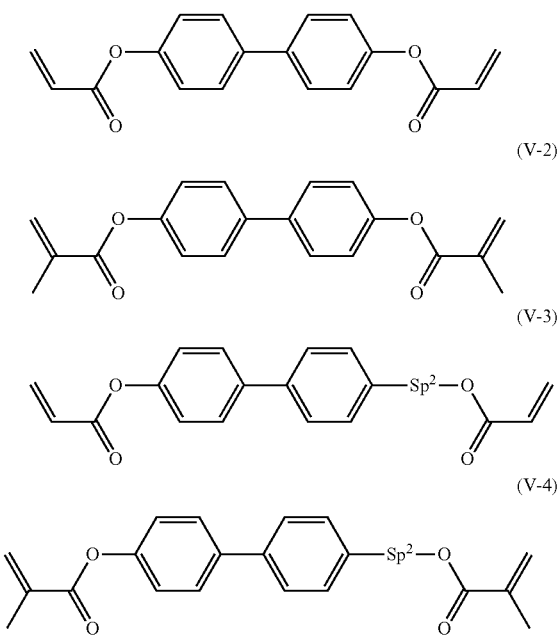

(In the formulae, Sp² represents an alkylene group having 2 to 5 carbon atoms.)

In the case where the polymerizable compound is added to the liquid crystal composition of the present invention, polymerization proceeds without a polymerization initiator, but a polymerization initiator may be contained to facilitate the polymerization. Examples of the polymerization initiator include benzoin ethers, benzophenones, acetophenones, benzylketals, and acylphosphine oxides.

The liquid crystal composition containing the polymerizable compound in the present invention is provided with liquid crystal alignment capability by polymerizing the polymerizable compound through irradiation with ultraviolet rays and is used for liquid crystal display elements that control the amount of transmitted light by using the birefringence of the liquid crystal composition. The liquid crystal composition is useful for liquid crystal display elements such as an AM-LCD (active matrix liquid crystal display element), a TN (nematic liquid crystal display element), an STN-LCD (super-twisted nematic liquid crystal display element), an OCB-LCD, and an IPS-LCD (in-plane switching liquid crystal display element). The liquid crystal composition is particularly useful for AM-LCDs and can be used for transmission or reflection-type liquid crystal display elements.

(Color Filter)

A color filter according to the present invention contains an organic pigment, and thus absorbs light having a particular wavelength and transmits light having a wavelength other than the particular wavelength.

Any base may be used as long as the base transmits light and may be suitably selected in accordance with the application. The base is made of, for example, resin or an inorganic material and is particularly preferably made of glass.

The color filter includes the base and the organic pigment. The organic pigment may be dispersed in the base or may be present only at the surface of the base. Alternatively, the organic pigment may be dispersed in a resin and the resin may be molded, or the organic pigment may be dispersed in the surface of the base in the form of a coating film.

The color filter may have any shape such as a plate-like shape, a film-like shape, a lens-like shape, or a spherical shape. The color filter may be a color filter partially including three-dimensional projections and depressions or a color filter obtained by forming fine projections and depressions on the surface thereof.

[Organic Pigment]

Examples of the organic pigment of the present invention include phthalocyanine pigments, insoluble azo pigments, azo lake pigments, anthraquinone pigments, quinacridone pigments, dioxazine pigments, diketopyrrolopyrrole pigments, anthrapyrimidine pigments, anthanthrone pigments, indanthrone pigments, flavanthrone pigments, perinone pigments, perylene pigments, thioindigo pigments, triarylmethane pigments, isoindolinone pigments, isoindoline pigments, metal complex pigments, quinophthalone pigments, and dye lake pigments.

The organic pigment may be suitably selected in accordance with the wavelength of light to be transmitted.

In the case of red color filters, red pigments may be used, such as a pigment having high transmittance at a wavelength of 600 nm or more and 700 nm or less. The pigments may be used alone or in combination of two or more. Specific examples of the pigments that can be favorably used include C.I. Pigment Red 81, 122, 177, 209, 242, and 254 and Pigment Violet 19. Among them, C.I. Pigment Red 254 is particularly preferred and the maximum transmission wavelength of C.I. Pigment Red 254 is between 660 nm and 700 nm.

The red color filter may further contain, as a toning pigment, at least one organic pigment selected from the group consisting of C.I. Pigment Orange 38 and 71 and C.I. Pigment Yellow 150, 215, 185, 138, and 139.

In the case of green color filters, green pigments may be used, such as a pigment having a maximum transmission wavelength at a wavelength of 500 nm or more and 600 nm or less. The pigments may be used alone or in combination of two or more. Specific examples of the pigments that can be favorably used include C.I. Pigment Green 7, 36, and 58. Among them, C.I. Pigment Green 58 is particularly preferred and the maximum transmission wavelength of C.I. Pigment Green 58 is between 510 nm and 550 nm.

The green color filter may further contain, as a toning pigment, at least one organic pigment selected from the group consisting of C.I. Pigment Yellow 150, 215, 185, and 138.

In the case of blue color filters, blue pigments may be used, such as a pigment having a maximum transmission wavelength at a wavelength of 400 nm or more and 500 nm or less. The pigments may be used alone or in combination of two or more. Specific examples of the pigments that can be favorably used include C.I. Pigment Blue 15:3 and 15:6, and C.I. Pigment Blue 1 serving as a triarylmethane pigment and/or a triarylmethane pigment represented by general formula (1) below (in the formula, $R^1$ to $R^6$ each independently represent a hydrogen atom, an alkyl group having 1 to 8 carbon atoms that may be substituted, or an aryl group that may be substituted; when $R^1$ to $R^6$ represent an alkyl group that may be substituted, a ring structure may be formed by bonding adjacent $R^1$ and $R^2$, bonding adjacent $R^3$ and $R^4$, and bonding adjacent $R^5$ and $R^6$; $X^1$ and $X^2$ each independently represent a hydrogen atom, a halogen atom, or an alkyl group having 1 to 8 carbon atoms that may be substituted; $Z^-$ represents at least one anion selected from a heteropolyoxometalate anion represented by $(P_2Mo_y W_{18-y}O_{62})^{6-}/6$ where y represents an integer of 0, 1, 2, or 3, a heteropolyoxometalate anion represented by $(SiMoW_{11}O_{40})^{4-}/4$, and a lacunary Dawson phosphotungstic heteropolyoxometalate anion; and, in the case where a single molecule contains a plurality of the formula (1), the plurality of the formula (1) may represent the same structure or different structures).

In the general formula (1), $R^1$ to $R^6$ may be the same or different. Therefore, an —NRR (RR represents any of combinations of $R^1R^2$, $R^3R^4$, and $R^5R^6$) group may be symmetrical or asymmetrical.

The maximum transmission wavelength of C.I. Pigment Blue 15:3 is between 440 nm and 480 nm. The maximum transmission wavelength of C.I. Pigment Blue 15:6 is between 430 nm and 470 nm. The maximum transmission wavelength of the triarylmethane pigment is between 410 nm and 450 nm.

The blue color filter may further contain, as a toning pigment, at least one organic pigment selected from the group consisting of C.I. Pigment Violet 23 and 37 and C.I. Pigment Blue 15, 15:1, 15:2, and 15:4.

[Chem. 19]

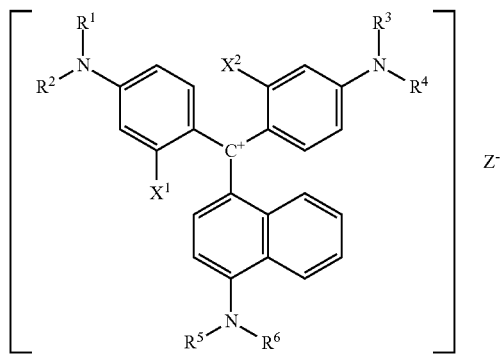

(1)

In the case where the color filter can be produced by a method in which a pigment dispersion body containing the organic pigment is applied onto a base, the pigment dispersion body may contain a publicly known pigment dispersing agent, a solvent, or the like in addition to the organic pigment. A dispersion liquid is prepared by dispersing the organic pigment using a solvent or a pigment dispersing agent, and the resulting dispersion liquid may be applied onto a base by, for example, a spin coating method, a roll coating method, an ink jet method, a spray coating method, or a printing method.

The organic pigment may be applied onto a base and dried to produce a color filter. In the case where the pigment dispersion body contains a curable resin, curing may be performed using heat or active energy rays to produce a color filter. Furthermore, a step of removing volatile components in a film may be performed by performing a heat treatment (post-baking) at 100° C. to 280° C. for a predetermined time using a heating apparatus such as a hot plate or an oven.

[State of Pigment Particles in Color Filter]

In the color filter of the present invention, the slope parameter that indicates the degree of aggregation of an organic pigment is 2 or less. In the color filter, the state of an organic pigment in the form of a color filter makes the highest contribution to suppressing display defects such as white streaks, variations in alignment, and image sticking. By specifying the slope parameter that indicates the degree of aggregation of organic pigment particles in the form of a color filter, a color filter that prevents the display defects is obtained. The degree of aggregation decreases as the slope parameter decreases. Therefore, the slope parameter is preferably 1.5 or less.

In the organic pigment, coarse particles having a size of more than 1000 nm are not preferred because they adversely affect the display state. Therefore, the amount of such coarse particles needs to be 1% or less. The surface of the color filter may be observed with an appropriate optical microscope or the like.

[Ultra-Small Angle X-Ray Scattering Profile]

The slope parameter that indicates the degree of aggregation of an organic pigment can be determined by analyzing an ultra-small angle X-ray scattering profile based on ultra-small angle X-ray scattering.

Specifically, this measurement method includes a step (A) of measuring an ultra-small angle X-ray scattering profile (measured scattering profile) of an organic pigment by ultra-small angle X-ray scattering, a step (B) of calculating a curve point on the scattering profile, a step (C) of determining an analysis region (c1) set in accordance with the curve point, and a step (D) of calculating a slope parameter in the analysis region c1.

Ultra-small angle X-ray scattering (USAXS) is a method for measuring not only scattering in a small-angle region in which the scattering angle is $0.1<(2\theta)<10°$ C., but also diffuse scattering and diffraction that occur in an ultra-small-angle region in which the scattering angle is $0°<(2\theta)\leq 0.1°$. In small angle X-ray scattering, when regions having different electron densities with a size of about 1 nm to 100 nm are present in a substance, the diffuse scattering of X-rays can be measured due to the difference in electron density. On the other hand, in ultra-small angle X-ray scattering, when regions having different electron densities with a size of about 1 nm to 1000 nm are present in a substance, the diffuse scattering of X-rays is measured due to the difference in electron density. The slope parameter of an object to be measured is determined on the basis of the scattering angle and the scattering intensity.

The main technology for achieving the ultra-small angle X-ray scattering includes two techniques: an advanced optical controlling technique that reduces the background scattering intensity in an ultra-small-angle region by decreasing the wavelength width or the beam diameter of incident X-rays and a technique that precisely measures a portion with a small scattering angle by increasing the distance from a sample to a detector as much as possible, that is, increasing the camera length. A laboratory-scale small-size apparatus uses mainly the former technique.

A program for determining a slope parameter from a small angle X-ray scattering profile may be a program that performs general differentiation and data interpolation. For example, a program such as MATLAB (The MathWorks, Inc.) is preferably used. In addition to the above program, a program such as Excel (manufactured by Microsoft) can be used for fitting conducted by the least-squares method to calculate the slope parameter.

In the case where the scattering profile of the organic pigment is measured, when the brightness of incident X-rays in an X-ray scattering instrument is $10^6$ brilliance (photons/sec/mm$^2$/mrad$^2$/0.1% bandwidth) or more, a sufficient scattering intensity can be measured and the brightness is preferably $10^7$ brilliance or more. When a substrate of a coating film is made of glass or the like, such a substrate easily absorbs X-rays and thus the brightness of incident X-rays considerably decreases. Therefore, the brightness of incident X-rays is preferably $10^{16}$ brilliance or more and more preferably $10^{18}$ brilliance or more in order to precisely measure the scattering profile of the organic pigment.

A light source available in a large synchrotron radiation facility such as SPring-8 in Hyogo Prefecture or Photon Factory in Ibaraki Prefecture can be used as a high-brightness X-ray source with $10^{16}$ brilliance or more. In such a facility, a desired scattering region can be set by selecting an appropriate camera length. Furthermore, optimum measurement conditions can be selected to achieve a wide range of purposes such as sufficient scattering intensity, prevention of sample damage, and protection of a detector. That is, an absorption plate made of several metals, which is called an attenuator, is used on the incident side or the exposure time is freely adjusted to be in the range of about 0.5 to 60 seconds. The attenuator is, for example, a thin film made of Au, Ag, or molybdenum.

The specific procedure of the measurement will be described below. In the step (A), a color filter is set on a sample holder, a sample stage, or the like of a commercially available X-ray diffraction apparatus. Then, the scattering intensities I at scattering angles (2θ), which are in the range of less than 10°, are measured to measure a small angle X-ray scattering profile (measured scattering profile).

In an ultra-small angle scattering apparatus that uses synchrotron radiation and is used for a coating film formed on a glass substrate, white light taken from a circular accelerator called a storage ring is converted into monochromatic light with a double crystal monochromator. Light with a wavelength (e.g., 1 Å) in an X-ray region is used as a radiation source. The light is made to enter a coating film disposed on the sample stage and a two-dimensional detector is exposed to the scattered light for a certain time. The scattering profile obtained in the form of concentric circles is one-dimensionally averaged and converted into scattering intensities I at scattering angles (2θ), which are in the range of less than 10°, to obtain a small angle X-ray scattering profile (measured scattering profile). The above-described process is the step (A).

Subsequently, in the step (B), a curve point is calculated in a region where the scattering vector q satisfies q<0.5 [nm$^{-1}$] or less in the measured scattering profile. The term "curve point" means a curve segment which is convex upward in the scattering profile shown as a chart in which both the scattering vector q and the scattering intensity I are plotted on a logarithmic scale.

First, the scattering vector q and the scattering profile I are converted into Log(q) and Log(I) which are to the base 10, respectively. Considering the function y=f(x) in a graph of x and y coordinates, the scattering profile is assumed to be expressed as the function Log(I)=F(Log(q)) for the sake of convenience. Assuming that Log(q)=Q and Log(I)=J, the scattering profile is expressed as J=F(Q), which is referred to as a scattering profile function.

The scattering profile function expressed as J=F(Q) is subjected to smoothing with a spline function. Furthermore, regarding the function G(Q) obtained as a result of the smoothing, the first derivative G'(Q)=dG(Q)/dQ is determined. The derivation of the function G(Q) obtained as a result of the smoothing with a spline function and the first derivative G'(Q) is conducted by a method described in NPL 1.

In the first derivative G'(Q), the minimum value G'min and the corresponding x coordinate X_gmin are then determined moving in a negative Q direction from Q=0. Furthermore, the maximum value G'max and the corresponding x coordinate X_gmax are determined moving in the negative Q direction. Subsequently, the intermediate value G'c=(G'max−G'min)/2 between the maximum value G'max and the minimum value G'min is determined.

In the x coordinate between X_gmax and X_gmin, a point indicated by the intermediate value G'c corresponds to the curve point in the original scattering profile function F(Q). The x coordinate of the curve point is expressed as Q=Q$_0$. When the x coordinate of the curve point is expressed using the scattering vector q, the x coordinate of the curve point on the scattering profile is given as q=q$_0$ from the relational expression Log(q$_0$)=Q$_0$.

Subsequently, in the step (C), an analysis region (c1) for determining the slope of the scattering profile is calculated. In a region where Q is smaller than the x coordinate Q$_0$ of the curve point, that is, in a region satisfying Q<Q$_0$, a region in which the first derivative G'(Q) is substantially flat is defined as an analysis region c1.

In the original scattering profile function F(Q) not subjected to differentiation, a profile segment that can be approximated to a straight line having a particular slope is provided in the analysis region c1.

An end point 1 and an end point 2 are determined so that the analysis region c1 is a region sectioned by the end point 1 and the end point 2. The value of the end point 1 on the x axis is Q=Q$_1$ and thus Log(q)=Log(q$_1$) is given. The value of the end point 2 on the x axis is Q=Q$_2$ and thus Log(q)=Log(q$_2$) is given.

The end point 1 of the analysis region c1 is determined as follows. The difference Δ=G'max−G'(Q$_1$) between the maximum value G'max and G'(Q$_1$) at a point to be set as the end point 1 is calculated. The first point that satisfies the difference Δ<0.1 when the data is scanned from the x coordinate Q$_0$ of the curve point in a direction in which Q decreases is defined as the end point 1. The x coordinate of the end point 1 is Q=Q$_1$, and q=q$_1$ is given.

Regarding the end point 2, an appropriate value needs to be determined in accordance with the measurement data. This reason is specifically described below. In a region with small q, the scattering intensity increases because of a strong influence of parasitic scattering or the like near a beam stopper used during the experiment. As a result, the slope of the scattering profile changes due to a factor other than the scattering derived from pigment particles. In other words, it is not necessarily appropriate that a large analysis region c1 is set by determining the end point 2 in an ultra-small angle region where Q is sufficiently small. On the other hand, if the end point 2 is close to the end point 1, the influence of data noise or the like is strengthened. As a result, the analysis in which the slope parameter in the analysis region c1 is calculated by the least-squares method in the following step (D) becomes meaningless.

The x coordinate of the end point 2 needs to be determined in consideration of the foregoing. The x coordinate of the end point 2 is $Q_2=\text{Log}(q_2)$. The value $q_2$ is determined using the value $q_1$ that has been determined. It is desirable that $q_2$ is determined so that the scattering profile can be approximated to a straight line as widely as possible within the range of $q_2=q_1/2$ to $q_1/3$.

Subsequently, in the step (D), the slope parameter of the scattering profile in the analysis region c1 determined by the end point 1 and the end point 2 is calculated. In the analysis region c1, the scattering intensity I and the scattering vector q have a relationship of $I(q) \propto q^{-dM}$. Therefore, the scattering profile function $\text{Log}(I)=F(\text{Log}(q))$ that represents the scattering profile in a double-logarithmic plot is represented by formula (1) below as a theoretical correlation function in the analysis region c1.

$$\text{Log}(I)=-d_M \times \text{Log}(q)+C\;(C:\text{constant}) \quad (1)$$

In the formula (1), $d_M$ is the slope parameter in the analysis region c1, and C is a constant.

The function fitting between the theoretical correlation function represented by the formula (1) and the scattering profile in the analysis region c1 is conducted by the least-squares method to calculate the slope parameter $d_M$.

The variables in the function fitting are $d_M$ and C. The function fitting is performed by the least-squares method so that the residual sum of squares Z between the theoretical correlation function and the scattering profile function is minimized. The smaller the residual sum of squares Z is, the higher the precision of the fitting is. In general, when Z decreases to be less than 2%, the fitting may be judged as convergence. Z is preferably less than 1% and more preferably less than 0.5%.

If the function fitting in this step does not favorably converge, that is, if Z is 2% or more, the data in the analysis region c1 widely varies or the scattering profile sharply deviates from the shape of a straight line. One of the causes may be that the analysis region c1 is not appropriate. In particular, in the case where data includes unnecessary scattering contribution due to an excessively large analysis region c1, the position of the end point 2 determined in the step (C) may be changed to a position close to the end point 1, and the step (D) is repeatedly conducted.

Another cause may be that the scattering intensity data obtained when the measurement is performed at an insufficient intensity of X-rays widely varies. In this case, the measurement data needs to be obtained by an ultra-small angle scattering experiment at an experimental facility at which stronger X-rays can be applied so that the scattering intensity data with a good S/N ratio is obtained.

In the case where the scattering profile does not have a clear curve segment, that is, in the case where the difference $\Delta G'\text{max-min}$ between the maximum value $G'\text{max}$ and the minimum value $G'\text{min}$ satisfies $\Delta G'\text{max-min}<0.1$, the curve point $Q_0$ (or $q_0$) needs to be imaginarily determined. If a curve segment clearly appears on the scattering profile with a different color filter sample that uses the same pigment, the curve point $Q_0$ of the color filter sample can be substituted for the curve point $Q_0$ of a sample with which the curve segment does not clearly appear. In the case where a curve segment does not clearly appear on the scattering profile and substitutable $Q_0$ is also not obtained, any segment on the scattering profile in the range of $q<0.5$ or $Q<\text{Log}(0.5)$ can be defined as the analysis region c1. In that analysis region c1, the slope parameter $d_M$ may be determined by the least-squares method.

The slope parameter $d_M$ is sometimes called "mass fractal dimensionality" in a physical manner. When the slope parameter $d_M$ is precisely determined in the analysis region c1, the scattering intensity I is represented by $I(q) \propto q^{-dM}$ and thus is in conformity with a power law of the scattering vector q. Therefore, $d_M$ is not more than 3 in principle. If $d_M$ is 3 or more, this may be caused by an inappropriate analysis region c1 or data with a large amount of noise as described above. Therefore, the analysis region c1 is reconsidered or an experiment is performed again with high-intensity X-rays, and then the step (A) to step (D) are performed, whereby the slope parameter of the scattering profile can be obtained as an analysis result.

As described above, when the slope parameter $d_M$ is precisely determined in the analysis region c1, the mass fractal dimensionality is clearly determined. This shows that the aggregation structure of an organic pigment contained in a color filter is fundamentally and physically a fractal-like self-similar structure. A large slope parameter $d_M$ indicates a large size of a self-similar aggregation structure, that is, a high degree of aggregation. Therefore, $d_M$ can be used as a quantitative index that indicates the degree of pigment aggregation in a color filter.

(Alignment Film)

In the liquid crystal display device of the present invention, when an alignment film for aligning a liquid crystal composition needs to be formed on surfaces of first and second substrates that contact the liquid crystal composition, the alignment film is disposed between a color filter and a liquid crystal layer. However, the thickness of the alignment film is at most 100 nm or less, which does not completely block the interaction between a coloring agent such as a pigment constituting the color filter and a liquid crystal compound constituting the liquid crystal layer.

In a liquid crystal display device that does not use an alignment film, higher interaction occurs between a coloring agent such as a pigment constituting the color filter and a liquid crystal compound constituting the liquid crystal layer.

The alignment film can be composed of a transparent organic material such as polyimide, polyamide, BCB (benzocyclobutene polymer), or polyvinyl alcohol. In particular, the alignment film is preferably a polyimide alignment film formed by imidizing polyamic acid synthesized from a diamine such as an aliphatic or alicyclic diamine, e.g., p-phenylene diamine or 4,4'-diaminodiphenylmethane, an aliphatic or alicyclic tetracarboxylic acid anhydride such as butanetetracarboxylic acid anhydride or 2,3,5-tricarboxycyclopentylacetic acid anhydride, and an aromatic tetracarboxylic acid anhydride such as pyromellitic acid dianhydride. In this case, the alignment is generally provided by rubbing, but the alignment film can be used without providing alignment when used as a vertical alignment film or the like.

The alignment film can be composed of a material containing chalcone, cinnamate, cinnamoyl, or a compound having an azo group or the like, and such a material may be used in combination with a material such as polyimide or polyamide. In this case, rubbing or an optical alignment technique may be used for the alignment film.

In the alignment film, a resin film is generally formed by applying the alignment film material onto a substrate by a method such as a spin coating method. A uniaxially stretching method, a Langmuir-Blodgett method, or the like can also be employed.

(Transparent Electrode)

In the liquid crystal display device of the present invention, the transparent electrode can be composed of a material such as a conductive metal oxide. The metal oxide can be indium oxide ($In_2O_2$), tin oxide ($SnO_2$), zinc oxide (ZnO), indium tin oxide ($In_2O_2$—$SnO_2$), indium zinc oxide ($In_2O_2$—ZnO), niobium-added titanium dioxide ($Ti_{1-x}Nb_xO_2$), fluorine-doped tin oxide, graphene nanoribbon, or metal nanowire and is preferably zinc oxide (ZnO), indium tin oxide ($In_2O_3$—$SnO_2$), or indium zinc oxide ($In_2O_3$—ZnO). The transparent conductive film can be patterned by, for example, a photo-etching method or a method that uses a mask.

The liquid crystal display device of the present invention is particularly useful for active matrix driving liquid crystal display devices and can be applied to liquid crystal display devices with a TN mode, an IPS mode, a polymer-stabilized IPS mode, an FFS mode, an OCB mode, a VA mode, or an ECB mode.

By combining a backlight, the liquid crystal display device is used in various applications such as monitors of liquid crystal televisions and personal computers, displays of cellular phones and smart phones, notebook computers, mobile information terminals, and digital signage. Examples of the backlight include a cold-cathode tube backlight, and a pseudo-white backlight with two wavelength peaks and a backlight with three wavelength peaks that use a light-emitting diode composed of an inorganic material or an organic EL element.

EXAMPLES

The present invention will now be further described in detail on the basis of Examples, but the present invention is not limited to Examples. In compositions of Examples and Comparative Examples below, "%" means "mass %".

In Examples, the measured properties are as follows.

$T_{ni}$: nematic phase-isotropic liquid phase transition temperature (° C.)

Δn: refractive index anisotropy at 25° C.
Δ∈: dielectric anisotropy at 25° C.
η: viscosity (mPa·s) at 20° C.
γ1: rotational viscosity (mPa·s) at 25° C.
VHR: voltage holding ratio (%) at 70° C.
(a value, which is expressed as a percentage, of the ratio of a measured voltage to an initial voltage, the measured voltage being obtained by injecting a liquid crystal composition into a cell having a thickness of 3.5 μm and performing measurement at an application voltage of 5 V, a frame time of 200 ms, and a pulse duration of 64 μs)

ID: ion density (pC/cm²) at 70° C.
(an ion density obtained by injecting a liquid crystal composition into a cell having a thickness of 3.5 μm and performing measurement at an application voltage of 20 V and a frequency of 0.05 Hz using MTR-1 (manufactured by TOYO) Corporation))

Image Sticking:

Image sticking of a liquid crystal display element was evaluated as follows. A predetermined fixed pattern was displayed in a display area for 1000 hours, and a uniform image was then displayed on the full screen. The level of a residual image of the fixed pattern was evaluated through visual inspection on the basis of the four-level criteria described below.

A: No residual image was observed.
B: A residual image was slightly observed, but was at an acceptable level.
C: A residual image was observed, and was at an unacceptable level.
D: A residual image was observed, and was at a very poor level.

In Examples, the following abbreviations are used for the description of compounds.

(Ring Structure)

[Chem. 20]

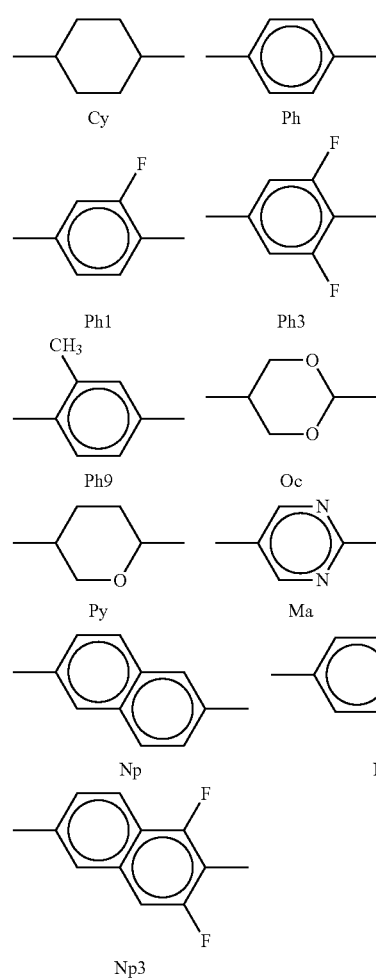

(Side Chain Structure and Linking Structure)

TABLE 1

| n (number) at terminal | $C_nH_{2n+1}$— |
|---|---|
| -2- | —$CH_2CH_2$— |
| —1O— | —$CH_2O$— |
| —O1— | —$OCH_2$— |
| —V— | —CO— |
| —VO— | —COO— |
| —CFFO— | —$CF_2O$— |
| —F | —F |
| —Cl | —Cl |
| —CN | —C≡N |
| —OCFFF | —$OCF_3$ |
| —CFFF | —$CF_3$ |
| —On | —$OC_nH_{2n+1}$— |
| -T- | —C≡C— |

TABLE 1-continued

| | |
|---|---|
| —N— | —CH=N—N=CH— |
| ndm- | $C_nH_{2n+1}$—HC=CH—$(CH_2)_{m-1}$— |
| -ndm | —$(CH_2)_{n-1}$—HC=CH—$C_mH_{2m+1}$ |
| ndmO— | $C_nH_{2n+1}$—HC=CH—$(CH_2)_{m-1}$O— |
| —Ondm | —O—$(CH_2)_{n-1}$—HC=CH—$C_mH_{2m+1}$ |
| -ndm- | —$(CH_2)_{n-1}$—HC=CH—$(CH_2)_{m-1}$— |

[Production of Color Filter]
[Production of Pigment Dispersion Liquid]

Synthetic Example 1

Synthesis of Copolymer a

A mixture containing 68 parts of ethyl methacrylate, 29 parts of 2-ethylhexyl methacrylate, 3 parts of thioglycolic acid, and 0.2 parts of a polymerization initiator ("Perbutyl (registered trademark) O" [active component: t-butyl peroxy-2-ethylhexanoate manufactured by NOF CORPORATION]) was added dropwise to 100 parts of xylene, which was kept in a nitrogen stream at 80° C., under stirring for four hours. After the completion of the addition, 0.5 parts of "Perbutyl (registered trademark) O" was added every four hours and the mixture was stirred at 80° C. for 12 hours. After the completion of the reaction, xylene was added to control the non-volatile content. Thus, a xylene solution of a copolymer a having a non-volatile content of 50% was prepared.

Synthetic Example 2

Synthesis of Copolymer b

A mixture containing 66 parts of ethyl methacrylate, 28 parts of 2-ethylhexyl methacrylate, 6 parts of thioglycolic acid, and 0.3 parts of a polymerization initiator ("Perbutyl (registered trademark) O" [active component: t-butyl peroxy-2-ethylhexanoate manufactured by NOF CORPORATION]) was added dropwise to 100 parts of xylene, which was kept in a nitrogen stream at 80° C., under stirring for four hours. After the completion of the addition, 0.5 parts of "Perbutyl (registered trademark) O" was added every four hours and the mixture was stirred at 80° C. for 12 hours. After the completion of the reaction, an appropriate amount of xylene was added to control the non-volatile content. Thus, a xylene solution of a copolymer b having a non-volatile content of 50% was prepared.

Synthetic Example 3

Synthesis of Polymer P

A mixture containing 54.5 parts of xylene, 19.0 parts of the copolymer a obtained in Synthetic Example 2, 38.0 parts of the copolymer b, and 7.5 parts of a 15% aqueous polyallylamine solution ("PAA-05" manufactured by Nitto Boseki Co., Ltd., number-average molecular weight: about 5000) was charged into a flask equipped with a stirrer, a reflux condenser, a nitrogen blowing tube, and a thermometer. The reaction was caused to proceed under stirring in a nitrogen stream at 140° C. for eight hours while water was distilled off using a separator and xylene was refluxed to a reaction solution.

After the completion of the reaction, an appropriate amount of xylene was added to control the non-volatile content. Thus, a polymer P, which was a modified polyamine, having a non-volatile content of 40% was prepared. The weight-average molecular weight of the resin was 11000 and the amine value was 16.0 mgKOH/g.

Production Example 1

Production of Powdery Pigment 1

FASTOGEN Green A110 (C.I. Pigment Green 58, brominated/chlorinated zinc phthalocyanine) manufactured by DIC Corporation was used as a powdery pigment 1.

Production Example 2

Production of Powdery Pigment 2

After 100 parts of the powdery pigment 1 obtained in Production Example 1, 300 parts of heptane, and 10 parts of the polymer P were mixed, 300 parts of 1.25 mm zirconia beads were added to the mixture. The mixture was stirred with a paint shaker (manufactured by Toyo Seiki Seisaku-Sho, Ltd.) at ordinary temperature for one hour. Then, the mixture was diluted with 200 parts of heptane and filtered to remove the zirconia beads. Thus, a pigment mixture solution was obtained.

After 400 parts of the obtained pigment mixture solution was charged into a separable flask equipped with a thermometer, a stirrer, a reflux condenser, and a nitrogen gas inlet tube, a material obtained by dissolving 2 parts of 2,2'-azobis(2-methylbutyronitrile) in a polymerizable monomer composition containing 5 parts of methyl methacrylate and 5 parts of ethylene glycol dimethacrylate was added to the separable flask. Stirring was performed at room temperature for 30 minutes, and then the temperature was increased to 80° C. The reaction was continued at 80° C. for 15 hours. After the temperature was decreased, filtration was performed to obtain a wet cake. The wet cake was dried with a hot-air drier at 100° C. for five hours and then crushed with a crusher to obtain a powdery pigment 2.

Production Example 3

Production of Powdery Pigment 3

With a double-arm kneader, 10 parts of the powdery pigment 1 obtained in Production Example 1, 100 parts of pulverized sodium chloride, and 10 parts of diethylene glycol were kneaded at 100° C. for eight hours. After the kneading, 1000 parts of water at 80° C. was added thereto and stirring was performed for one hour. The resulting product was filtered, washed with hot water, dried, and crushed to obtain a powdery pigment 3.

Production Example 4

Production of Dispersion Liquid 1

After 5 parts of the powdery pigment 1 obtained in Production Example 1, 33.3 parts of propylene glycol monomethyl ether (PGMA), and 3 parts of the polymer P were mixed, 65 parts of 0.5 mm Sepr beads were added thereto. The mixture was stirred with a paint shaker (manufactured by Toyo Seiki Seisaku-Sho, Ltd.) for four hours. The resulting mixture solution was filtered to remove the Sepr beads. Thus, a dispersion liquid 1 was obtained.

Production Example 5

Production of Dispersion Liquid 2

A dispersion liquid 2 was obtained in the same manner as in Production Example 4, except that the powdery pigment 1 was changed to the powdery pigment 2 and the polymer P was changed to AJISPER PB821 (manufactured by Ajinomoto Fine-Techno Co., Inc.), and 0.1 parts of quinoline was further added.

Production Example 6

Production of Dispersion Liquid 3

A dispersion liquid 3 was obtained in the same manner as in Production Example 5, except that 5 parts of the powdery pigment 2, 33.3 parts of PGMA, and 3 parts of AJISPER PB821 were added, and quinoline was changed to pyrrole.

Production Example 7

Production of Dispersion Liquid 4

A dispersion liquid 4 was obtained in the same manner as in Production Example 6, except that pyrrole was changed to oxazole.

Production Example 8

Production of Dispersion Liquid 5

A dispersion liquid 5 was obtained in the same manner as in Production Example 7, except that oxazole was changed to pyrrolidine.

Production Example 9

Production of Powdery Pigment 4 and Dispersion Liquid 6

An ∈-type copper phthalocyanine pigment ("FASTOGEN Blue EP-193" manufactured by DIC Corporation) was used as a powdery pigment 4. After 5 parts of the powdery pigment 4, 33.3 parts of propylene glycol monomethyl ether (PGMA), and 3 parts of the polymer A were mixed, 65 parts of 0.5 mm Sepr beads were added thereto. The mixture was stirred with a paint shaker (manufactured by Toyo Seiki Seisaku-Sho, Ltd.) for four hours. The resulting mixture solution was filtered to remove the Sepr beads. Thus, a dispersion liquid 6 was obtained.

Production Example 10

Production of Powdery Pigment 5 and Dispersion Liquid 7

A diketopyrrolopyrrole red pigment PR254 ("Irgaphor Red B-CF"; R-1 manufactured by Ciba Specialty Chemicals) was used as a powdery pigment 5. After 5 parts of the powdery pigment 5, 33.3 parts of propylene glycol monomethyl ether (PGMA), and 3 parts of the polymer P were mixed, 65 parts of 0.5 mm Sepr beads were added thereto. The mixture was stirred with a paint shaker (manufactured by Toyo Seiki Seisaku-Sho, Ltd.) for four hours. The resulting mixture solution was filtered to remove the Sepr beads. Thus, a dispersion liquid 7 was obtained.

[Production of Color Filter]

Production Example 11

Production of Color Filter 1

Figure 3:
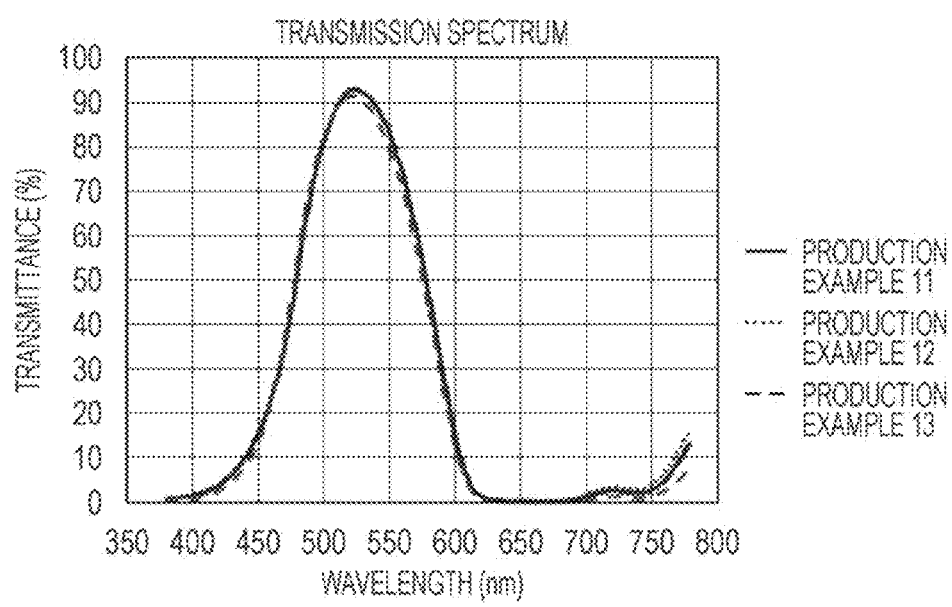
FIG. 3 shows transmission spectra of color filters.

A cover glass (borosilicate cover glass manufactured by TGK) was set in a spin coater (Opticoat MS-A100 manufactured by MIKASA CO., LTD.). The dispersion liquid 1 obtained in Production Example 4 was applied to the cover glass in an amount of 1.5 ml and spin coating was performed at 600 rpm. The resulting coating film was dried in a thermostat at 90° C. for three minutes and then heat-treated at 230° C. for three hours to obtain a color filter 1. The maximum transmission wavelength of the color filter 1 was 523 nm. FIG. 3 shows the transmission spectrum.

[Measurement of Color Filter 1 with USAXS]

The color filter was fixed to an A1 sample holder. The holder was then set in a sample stage for transmission measurement. The measurement of ultra-small angle X-ray scattering and the calculation of a slope parameter were performed under the following conditions. Table 2 shows the results.

The measurement instrument and the measurement method are as follows.

Measurement apparatus: Frontier Softmaterial Beamline BL03XU Second Hatch in a large synchrotron radiation facility SPring-8

Measurement mode: Ultra-small angle X-ray scattering (USAXS)

Measurement conditions: wavelength 0.1 nm, camera length 6 m, beam spot size 140 µm×80 µm, no attenuator, exposure time 30 seconds, 2θ=0.01 to 1.5°

Analysis software: The imaging of two-dimensional data and the conversion of two-dimensional data into a one-dimensional scattering profile were performed with Fit2D (available from a web site [http://www.esrf.eu/computing/scientific/FIT2D/] of European Synchrotron Radiation Facility).

The differentiation and smoothing of the scattering profile were performed with software MATLAB manufactured by The MathWorks, Inc. Subsequently, the calculation of a curve point and the calculation of an analysis region were performed with software Excel manufactured by Microsoft to obtain a slope parameter.

Z: Z was used for judging the linearity and set within 2%.

Production Example 12

Production of Color Filter 2

A color filter 2 was obtained in the same manner as in Example 1, except that the dispersion liquid 1 was changed to the dispersion liquid 2. The maximum transmission wavelength of the color filter 2 was 522 nm. FIG. 3 shows the transmission spectrum. For the color filter 2, the measurement of ultra-small angle X-ray scattering and the calculation of a slope parameter were performed in the same manner as in Production Example 11. Table 2 shows the results.

Production Example 13

Production of Color Filter 3

A color filter 3 was obtained in the same manner as in Production Example 11, except that the dispersion liquid 1 was changed to the dispersion liquid 3. The maximum transmission wavelength of the color filter 3 was 523 nm. FIG. 3 shows the transmission spectrum. For the color filter 3, the measurement of ultra-small angle X-ray scattering and the calculation of a slope parameter were performed in the same manner as in Production Example 11. Table 2 shows the results.

Production Example 14

Production of Color Filter 4

Figure 4:
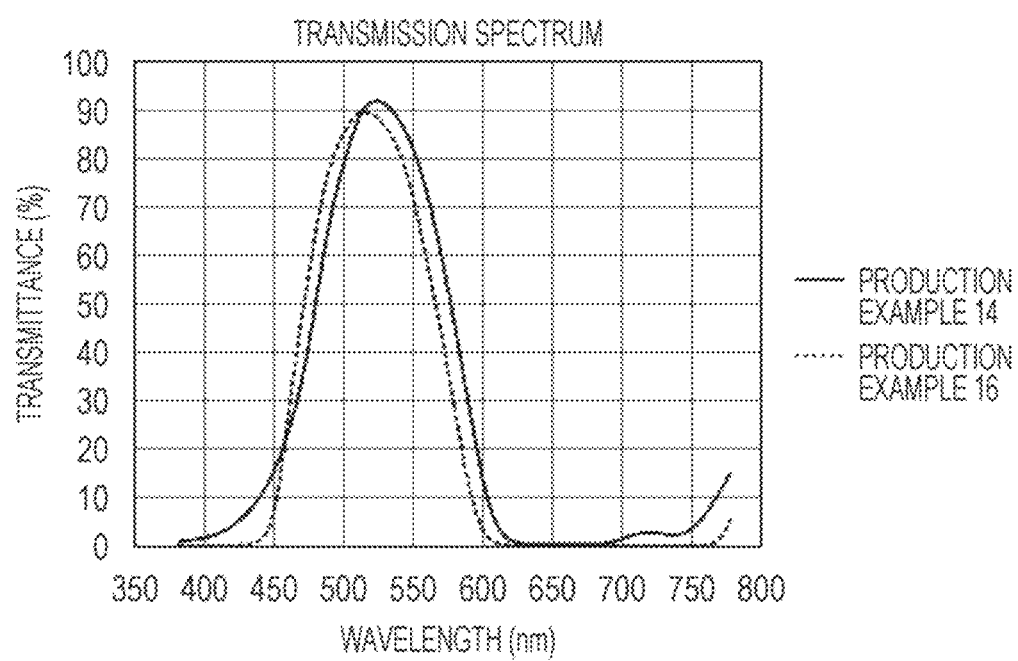
FIG. 4 shows transmission spectra of color filters.

A color filter 4 was obtained in the same manner as in Production Example 11, except that the dispersion liquid 1 was changed to the dispersion liquid 4. The maximum transmission wavelength of the color filter 4 was 523 nm. FIG. 4 shows the transmission spectrum. For the color filter 4, the measurement of ultra-small angle X-ray scattering and the calculation of a slope parameter were performed in the same manner as in Production Example 11. Table 2 shows the results.

Production Example 15

Production of Color Filter 5

A color filter 5 was obtained in the same manner as in Production Example 11, except that the dispersion liquid 1 was changed to the dispersion liquid 5. For the color filter 5, the measurement of ultra-small angle X-ray scattering and the calculation of a slope parameter were performed in the same manner as in Production Example 11. Table 2 shows the results.

Production Example 16

Production of Color Filter 6

A cover glass (borosilicate cover glass manufactured by TGK) was set in a spin coater (Opticoat MS-A100 manufactured by MIKASA CO., LTD.). The dispersion liquid 3 obtained in Production Example 6 was applied to the cover glass in an amount of 1.5 ml and spin coating was performed at 600 rpm. The resulting coating film was dried in a thermostat at 90° C. for three minutes to obtain a color filter 6. The maximum transmission wavelength of the color filter 6 was 515 nm. FIG. 4 shows the transmission spectrum. For the color filter 6, the measurement of ultra-small angle X-ray scattering and the calculation of a slope parameter were performed in the same manner as in Production Example 11. Table 2 shows the results.

Production Example 17

Production of Color Filter 7

A color filter 7 was obtained in the same manner as in Production Example 11, except that the dispersion liquid 1 was changed to the dispersion liquid 6. The maximum transmission wavelength of the color filter 7 was 435 nm. For the color filter 7, the measurement of ultra-small angle X-ray scattering and the calculation of a slope parameter were performed in the same manner as in Production Example 11. Table 2 shows the results.

Production Example 18

Production of Color Filter 8

A color filter 8 was obtained in the same manner as in Production Example 16, except that the dispersion liquid 3 obtained in Production Example 6 was changed to the dispersion liquid 6 obtained in Production Example 10. The maximum transmission wavelength of the color filter 8 was 435 nm. For the color filter 8, the measurement of ultra-small angle X-ray scattering and the calculation of a slope parameter were performed in the same manner as in Production Example 11. Table 2 shows the results.

Production Example 19

Production of Color Filter 9

A color filter 9 was obtained in the same manner as in Production Example 11, except that the dispersion liquid 1 was changed to the dispersion liquid 7. For the color filter 9, the measurement of ultra-small angle X-ray scattering and the calculation of a slope parameter were performed in the same manner as in Production Example 11. Table 2 shows the results.

Production Example 20

Production of Color Filter 10

A color filter 10 was obtained in the same manner as in Production Example 16, except that the dispersion liquid 3 obtained in Production Example 6 was changed to the dispersion liquid 7 obtained in Production Example 10. For the color filter 10, the measurement of ultra-small angle x-ray scattering and the calculation of a slope parameter were performed in the same manner as in Example 1. Table 2 shows the results.

TABLE 2

| Color filter No. | Analysis region c1 of scattering profile | | | Slope parameter |
|---|---|---|---|---|
| | End point 2 (q2 [nm$^{-1}$]) | End point 1 (q1 [nm$^{-1}$]) | Curve point q0 [nm$^{-1}$] | |
| Color filter 1 | 0.08 | 0.17 | 0.245 | 0.85 |
| Color filter 2 | 0.07 | 0.14 | 0.219 | 0.78 |
| Color filter 3 | 0.08 | 0.16 | 0.251 | 1.24 |
| Color filter 4 | 0.07 | 0.14 | 0.245 | 1.25 |
| Color filter 5 | 0.10 | 0.19 | 0.245 | 1.62 |
| Color filter 6 | 0.10 | 0.19 | 0.269 | 2.14 |
| Color filter 7 | 0.08 | 0.16 | 0.248 | 0.95 |
| Color filter 8 | 0.08 | 0.16 | 0.270 | 2.10 |
| Color filter 9 | 0.07 | 0.15 | 0.250 | 1.11 |
| Color filter 10 | 0.08 | 0.16 | 0.267 | 2.18 |

Examples 1 to 7

An electrode structure was formed on at least one of first and second substrates, and an alignment film having a horizontal alignment property was formed on each of surfaces of the first and second substrates facing each other. Then, a weak rubbing treatment was performed, an IPS cell was made, and a liquid crystal composition 1 described below was sandwiched between the first substrate and the second substrate. Table 3 shows the physical properties of the liquid crystal composition 1. Subsequently, liquid crystal display devices of Examples 1 to 7 were produced using the color filters 1 to 5, 7, and 9 listed in Table 2 ($d_{gap}$=4.0 μm, alignment film AL-1051). The VHR and ID of the produced liquid crystal display devices were measured. The image sticking of the produced liquid crystal display devices was also evaluated. Table 4 shows the results.

TABLE 3

| | |
|---|---|
| $T_{NI}$/° C. | 75.8 |
| Δn | 0.112 |
| no | 1.488 |
| $\epsilon_\perp$ | 5.5 |
| Δε | 2.9 |
| η/mPa · s | 13.5 |

[Chem. 21]

| Chemical structure | Proportion | Abbreviation |
|---|---|---|
| 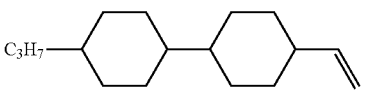 | 48% | 3-Cy—Cy-1d0 |
| 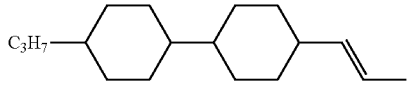 | 4% | 3-Cy—Cy-1d1 |
| 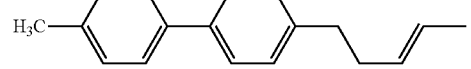 | 8% | 1-Ph—Ph-3d1 |
| 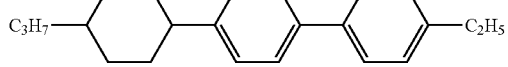 | 5% | 3-Cy—Ph—Ph-2 |
| 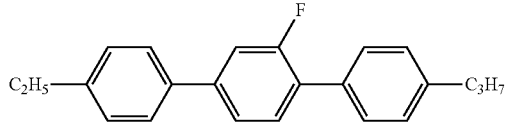 | 5% | 2-Ph—Ph1—Ph-3 |
| 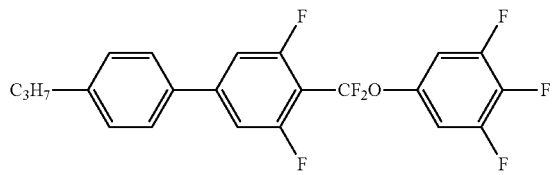 | 2% | 3-Ph—Ph3—CFFO—Ph3—F |
| 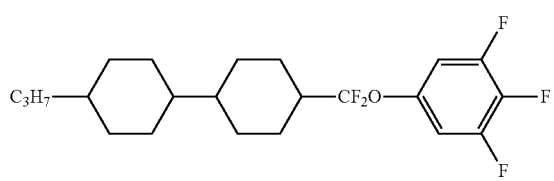 | 3% | 3-Cy—Cy—CFFO—Ph3—F |
| 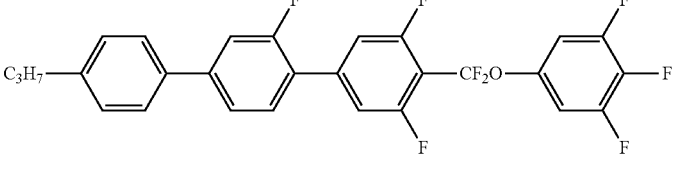 | 7% | 3-Ph—Ph1—Ph3—CFFO—Ph3—F |
| 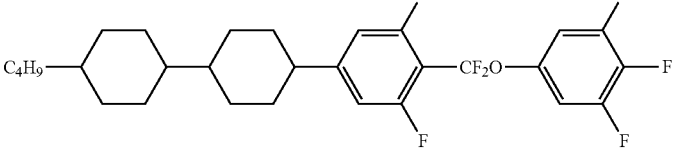 | 5% | 4-Cy—Cy—Ph3—CFFO—Ph3—F |

TABLE 4

|  | Example 1 | Example 2 | Example 3 | Example 4 | Example 5 | Example 6 | Example 7 |
|---|---|---|---|---|---|---|---|
| Liquid crystal composition | Liquid crystal composition 1 | Liquid crystal composition 1 | Liquid crystal composition 1 | Liquid crystal composition 1 | Liquid crystal composition 1 | Liquid crystal composition 1 | Liquid crystal composition 1 |
| Color filter | Color filter 1 | Color filter 2 | Color filter 3 | Color filter 4 | Color filter 5 | Color filter 7 | Color filter 9 |
| VHR | 99.4 | 99.5 | 99.3 | 99.3 | 99.1 | 99.4 | 99.3 |
| ID | 21 | 15 | 50 | 51 | 69 | 31 | 43 |
| Image sticking | A | A | A | A | B | A | A |

It was found that the liquid crystal composition 1 had a liquid crystal phase temperature range of 75.8° C., which was practical for use as a liquid crystal composition for TVs, a dielectric anisotropy with a high absolute value, low viscosity, and an appropriate value of Δn.

In the liquid crystal display devices of Examples 1 to 7, high VHRs and low IDs were achieved. In the evaluation of image sticking, no residual image was observed or a residual image was slightly observed, which was at an acceptable level.

Examples 8 to 21

Liquid crystal compositions 2 and 3 listed in Table 5 were sandwiched as in Example 1. Liquid crystal display devices of Examples 8 to 21 were produced using the color filters 1 to 5, 7, and 9 listed in Table 2 and the VHR and ID were measured. The image sticking of the liquid crystal display devices was also evaluated. Tables 6 and 7 show the results.

TABLE 5

| Name of compound | Content (%) |
|---|---|
| Liquid crystal composition 2 | |
| 4-Cy-Cy-1d0 | 15 |
| 0d1-Cy-Cy-Ph-1 | 4 |

TABLE 5-continued

| Name of compound | Content (%) |
|---|---|
| 0d3-Cy-Cy-Ph-1 | 14 |
| 3-Cy-Ph—Ph-Cy-3 | 3 |
| 3-Cy-Ph—Ph1-Cy-3 | 4 |
| 1-Cy-Cy-Ph3—F | 9 |
| 2-Cy-Ph—Ph3—F | 10 |
| 3-Cy-Ph—Ph3—F | 10 |
| 5-Cy-Ph—Ph3—F | 5 |
| 0d1-Cy-Cy-Ph1—F | 8 |
| 3-Cy-Cy-Ph1—Ph3—F | 8 |
| 2-Ph—Ph3—CFFO—Ph3—F | 4 |
| 3-Ph—Ph3—CFFO—Ph3—F | 6 |
| $T_{ni}/°C.$ | 100.7 |
| Δn | 0.094 |
| Δε | 8.0 |
| γ1/mPa·s | 108 |
| η/mPa·s | 22.2 |
| Liquid crystal composition 3 | |
| 5-Cy-Cy-1d0 | 5 |
| 3-Cy-Cy-1d1 | 10 |
| 0d1-Cy-Cy-Ph-1 | 8 |
| 5-Cy-Cy-Ph—O1 | 6 |
| 2-Ph—Ph1—Ph-3 | 8 |
| 2-Cy-Cy-Ph3—F | 11 |
| 3-Cy-Cy-Ph3—F | 15 |
| 5-Cy-Cy-Ph3—F | 5 |
| 3-Cy-Ph—Ph3—F | 6 |
| 3-Cy-Ph—Ph1—F | 9 |
| 4-Cy-Cy-Ph—OCFFF | 4 |
| 3-Cy-Cy-CFFO—Ph3—F | 7 |
| 5-Cy-Cy-CFFO—Ph3—F | 4 |
| 3-Cy-Cy-Ph1—Ph3—F | 2 |
| $T_{ni}/°C.$ | 103.2 |
| Δn | 0.102 |
| Δε | 7.1 |
| γ1/mPa·s | 96 |
| η/mPa·s | 20.8 |

TABLE 6

|  | Example 8 | Example 9 | Example 10 | Example 11 | Example 12 | Example 13 | Example 14 |
|---|---|---|---|---|---|---|---|
| Liquid crystal composition | Liquid crystal composition 2 | Liquid crystal composition 2 | Liquid crystal composition 2 | Liquid crystal composition 2 | Liquid crystal composition 2 | Liquid crystal composition 2 | Liquid crystal composition 2 |
| Color filter | Color filter 1 | Color filter 2 | Color filter 3 | Color filter 4 | Color filter 5 | Color filter 7 | Color filter 9 |
| VHR | 99.6 | 99.6 | 99.4 | 99.4 | 99.2 | 99.5 | 99.5 |
| ID | 18 | 14 | 48 | 50 | 72 | 28 | 37 |
| Image sticking | A | A | A | A | B | A | A |

TABLE 7

|  | Example 15 | Example 16 | Example 17 | Example 18 | Example 19 | Example 20 | Example 21 |
|---|---|---|---|---|---|---|---|
| Liquid crystal composition | Liquid crystal composition 3 | Liquid crystal composition 3 | Liquid crystal composition 3 | Liquid crystal composition 3 | Liquid crystal composition 3 | Liquid crystal composition 3 | Liquid crystal composition 3 |
| Color filter | Color filter 1 | Color filter 2 | Color filter 3 | Color filter 4 | Color filter 5 | Color filter 7 | Color filter 9 |
| VHR | 99.5 | 99.5 | 99.3 | 99.3 | 99.0 | 99.4 | 99.4 |
| ID | 26 | 20 | 47 | 51 | 66 | 33 | 39 |
| Image sticking | A | A | A | A | A | A | A |

In the liquid crystal display devices of Examples 8 to 21, high VHRs and low IDs were achieved. In the evaluation of image sticking, no residual image was observed or a residual image was slightly observed, which was at an acceptable level.

Examples 22 to 42

Liquid crystal compositions 4 to 6 listed in Table 8 were sandwiched as in Example 1. Liquid crystal display devices of Examples 22 to 42 were produced using the color filters 1 to 5, 7, and 9 listed in Table 2 and the VHR and ID were measured. The image sticking of the liquid crystal display devices was also evaluated. Tables 9 to 11 show the results.

TABLE 8

| Name of compound | Content (%) |
|---|---|
| Liquid crystal composition 4 | |
| 5-Cy-Cy-1d0 | 15 |
| 3-Cy-Cy-1d1 | 2 |
| 0d1-Cy-Cy-Ph-1 | 12 |
| 2-Ph—Ph1—Ph-3 | 3 |
| 2-Ph—Ph1—Ph4 | 3 |
| 2-Cy-Cy-Ph3—F | 8 |
| 2-Cy-Ph—Ph3—F | 3 |
| 3-Cy-Ph—Ph3—F | 9 |
| 4-Cy-Cy-Ph—OCFFF | 14 |
| 3-Ph—Ph3—CFFO—Ph3—F | 11 |
| 2-Cy-Cy-CFFO—Ph3—F | 9 |
| 3-Cy-Cy-CFFO—Ph3—F | 8 |
| 3-Cy-Cy-Ph1—Ph3—F | 3 |
| $T_{ni}/°C$ | 90.2 |
| $\Delta n$ | 0.098 |
| $\Delta \epsilon$ | 9.1 |
| $\gamma 1/mPa \cdot s$ | 90 |
| $\eta/mPa \cdot s$ | 18.1 |
| Liquid crystal composition 5 | |
| 5-Cy-Cy-1d0 | 10 |

TABLE 8-continued

| Name of compound | Content (%) |
|---|---|
| 3-Cy-Cy-1d1 | 5 |
| 0d1-Cy-Cy-Ph-1 | 8 |
| 0d3-Cy-Cy-Ph-1 | 12 |
| 2-Ph—Ph1—Ph-5 | 2 |
| 3-Cy-Ph—Ph-Cy-3 | 3 |
| 3-Cy-Ph—Ph1-Cy-3 | 3 |
| 1-Cy-Cy-Ph3—F | 9 |
| 2-Cy-Cy-Ph3—F | 10 |
| 3-Cy-Cy-Ph3—F | 6 |
| 5-Cy-Cy-Ph3—F | 5 |
| 0d1-Cy-Cy-Ph1—F | 8 |
| 2-Ph—Ph3—CFFO—Ph3—F | 4 |
| 3-Ph—Ph3—CFFO—Ph3—F | 6 |
| 3-Cy-Cy-Ph1—Ph3—F | 9 |
| $T_{ni}/°C$ | 110.0 |
| $\Delta n$ | 0.099 |
| $\Delta \epsilon$ | 8.3 |
| $\gamma 1/mPa \cdot s$ | 112 |
| $\eta/mPa \cdot s$ | 23.4 |
| Liquid crystal composition 6 | |
| 5-Cy-Cy-1d0 | 12 |
| 3-Cy-Cy-1d1 | 25 |
| 3-Cy-Cy-1d1 | 12 |
| 0d1-Cy-Cy-Ph-1 | 4 |
| 0d3-Cy-Cy-Ph-1 | 9 |
| 2-Ph—Ph1—Ph3—F | 5 |
| 3-Ph—Ph1—Ph3—F | 9 |
| 2-Ph—Ph3—CFFO—Ph3—F | 4 |
| 3-Ph—Ph3—CFFO—Ph3—F | 6 |
| 3-Cy-Cy-CFFO—Ph3—F | 2 |
| 5-Cy-Cy-CFFO—Ph3—F | 3 |
| 3-Cy-Cy-Ph1—Ph3—F | 9 |
| $T_{ni}/°C$ | 77.4 |
| $\Delta n$ | 0.101 |
| $\Delta \epsilon$ | 7.0 |
| $\gamma 1/mPa \cdot s$ | 86 |
| $\eta/mPa \cdot s$ | 14.2 |

TABLE 9

|  | Example 22 | Example 23 | Example 24 | Example 25 | Example 26 | Example 27 | Example 28 |
|---|---|---|---|---|---|---|---|
| Liquid crystal composition | Liquid crystal composition 4 | Liquid crystal composition 4 | Liquid crystal composition 4 | Liquid crystal composition 4 | Liquid crystal composition 4 | Liquid crystal composition 4 | Liquid crystal composition 4 |
| Color filter | Color filter 1 | Color filter 2 | Color filter 3 | Color filter 4 | Color filter 5 | Color filter 7 | Color filter 9 |
| VHR | 99.5 | 99.6 | 99.4 | 99.4 | 99.2 | 99.5 | 99.5 |
| ID | 18 | 15 | 42 | 43 | 60 | 25 | 31 |
| Image sticking | A | A | B | B | B | A | A |

TABLE 10

|  | Example 29 | Example 30 | Example 31 | Example 32 | Example 33 | Example 34 | Example 35 |
|---|---|---|---|---|---|---|---|
| Liquid crystal composition | Liquid crystal composition 5 | Liquid crystal composition 5 | Liquid crystal composition 5 | Liquid crystal composition 5 | Liquid crystal composition 5 | Liquid crystal composition 5 | Liquid crystal composition 5 |
| Color filter | Color filter 1 | Color filter 2 | Color filter 3 | Color filter 4 | Color filter 5 | Color filter 7 | Color filter 9 |
| VHR | 99.7 | 99.7 | 99.5 | 99.5 | 99.2 | 99.6 | 99.6 |
| ID | 22 | 17 | 48 | 47 | 67 | 29 | 40 |
| Image sticking | A | A | A | A | B | A | A |

TABLE 11

|  | Example 36 | Example 37 | Example 38 | Example 39 | Example 40 | Example 41 | Example 42 |
|---|---|---|---|---|---|---|---|
| Liquid crystal composition | Liquid crystal composition 6 | Liquid crystal composition 6 | Liquid crystal composition 6 | Liquid crystal composition 6 | Liquid crystal composition 6 | Liquid crystal composition 6 | Liquid crystal composition 6 |
| Color filter | Color filter 1 | Color filter 2 | Color filter 3 | Color filter 4 | Color filter 5 | Color filter 7 | Color filter 9 |
| VHR | 99.6 | 99.7 | 99.4 | 99.4 | 99.1 | 99.6 | 99.5 |
| ID | 24 | 18 | 51 | 50 | 74 | 38 | 45 |
| Image sticking | A | A | B | B | B | A | A |

In the liquid crystal display devices of Examples 22 to 42, high VHRs and low IDs were achieved. In the evaluation of image sticking, no residual image was observed or a residual image was slightly observed, which was at an acceptable level.

Examples 43 to 63

An electrode structure was formed on each of first and second substrates, and an alignment film having a horizontal alignment property was formed on each of surfaces of the first and second substrates facing each other. Then, a weak rubbing treatment was performed, a TN cell was made, and liquid crystal compositions 7 to 9 described in Table 12 were sandwiched between the first substrate and the second substrate. Subsequently, liquid crystal display devices of Examples 43 to 63 were produced using the color filters 1 to 5, 7, and 9 listed in Table 2 ($d_{gap}$=3.5 μm, alignment film SE-7492). The VHR and ID of the produced liquid crystal display devices were measured. The image sticking of the produced liquid crystal display devices was also evaluated. Tables 13 to 15 show the results.

TABLE 12

| Name of compound | Content (%) |
|---|---|
| Liquid crystal composition 7 | |
| 3-Cy-Cy-1d0 | 38 |
| 3-Cy-Cy-1d1 | 9 |
| 0d1-Cy-Cy-Ph-1 | 16 |
| 0d3-Cy-Cy-Ph-1 | 4 |
| 2-Ph—Ph3—CFFO—Ph3—F | 2 |
| 3-Ph—Ph3—CFFO—Ph3—F | 12 |
| 3-Cy-Cy-CFFO—Ph3—F | 7 |
| 3-Ph—Ph—Ph1—Ph3—F | 1 |
| 3-Ph—Ph1—Ph3—CFFO—Ph3—F | 2 |
| 2-Py—Ph—Ph3—CFFO—Ph3—F | 9 |
| $T_{ni}$/° C. | 76.0 |
| Δn | 0.097 |

TABLE 12-continued

| Name of compound | Content (%) |
|---|---|
| Δε | 6.8 |
| γ1/mPa · s | 83 |
| η/mPa · s | 14.5 |
| Liquid crystal composition 8 | |
| 3-Cy-Cy-1d0 | 38 |
| 3-Cy-Cy-1d1 | 14 |
| 0d3-Cy-Cy-Ph-1 | 8 |
| 3-Ph—Ph3—CFFO—Ph3—F | 9 |
| 3-Cy-Cy-CFFO—Ph3—F | 15 |
| 3-Ph—Ph1—Ph3—CFFO—Ph3—F | 2 |
| 4-Ph—Ph1—Ph3—CFFO—Ph3—F | 7 |
| 5-Ph—Ph1—Ph3—CFFO—Ph3—F | 7 |
| $T_{ni}$/° C. | 81.8 |
| Δn | 0.099 |
| Δε | 8.0 |
| γ1/mPa · s | 83 |
| η/mPa · s | 14.6 |
| Liquid crystal composition 9 | |
| 3-Cy-Cy-1d0 | 30 |
| 3-Cy-Cy-1d1 | 17 |
| 0d1-Cy-Cy-Ph-1 | 7 |
| 0d3-Cy-Cy-Ph-1 | 7 |
| 3-Cy-Cy-Ph-2 | 2 |
| 2-Ph—Ph1—Ph-4 | 2 |
| 2-Ph—Ph1—Ph3—F | 8 |
| 3-Ph—Ph1—Ph3—F | 12 |
| 3-Ph—Ph3—Ph3—F | 4 |
| 3-Cy-Cy-Ph1—CFFO—Ph3—F | 11 |
| $T_{ni}$/° C. | 75.0 |
| Δn | 0.112 |
| Δε | 8.7 |
| γ1/mPa · s | 87 |
| η/mPa · s | 15.2 |

TABLE 13

|  | Example 43 | Example 44 | Example 45 | Example 46 | Example 47 | Example 48 | Example 49 |
|---|---|---|---|---|---|---|---|
| Liquid crystal composition | Liquid crystal composition 7 | Liquid crystal composition 7 | Liquid crystal composition 7 | Liquid crystal composition 7 | Liquid crystal composition 7 | Liquid crystal composition 7 | Liquid crystal composition 7 |
| Color filter | Color filter 1 | Color filter 2 | Color filter 3 | Color filter 4 | Color filter 5 | Color filter 7 | Color filter 9 |
| VHR | 99.6 | 99.6 | 99.4 | 99.4 | 99.2 | 99.6 | 99.5 |
| ID | 23 | 19 | 56 | 57 | 78 | 35 | 42 |
| Image sticking | A | A | B | B | B | A | A |

TABLE 14

|  | Example 50 | Example 51 | Example 52 | Example 53 | Example 54 | Example 55 | Example 56 |
|---|---|---|---|---|---|---|---|
| Liquid crystal composition | Liquid crystal composition 8 | Liquid crystal composition 8 | Liquid crystal composition 8 | Liquid crystal composition 8 | Liquid crystal composition 8 | Liquid crystal composition 8 | Liquid crystal composition 8 |
| Color filter | Color filter 1 | Color filter 2 | Color filter 3 | Color filter 4 | Color filter 5 | Color filter 7 | Color filter 9 |
| VHR | 99.6 | 99.7 | 99.5 | 99.5 | 99.1 | 99.6 | 99.6 |
| ID | 19 | 12 | 46 | 48 | 70 | 29 | 38 |
| Image sticking | A | A | A | B | B | A | A |

TABLE 15

|  | Example 50 | Example 51 | Example 52 | Example 53 | Example 54 | Example 55 | Example 56 |
|---|---|---|---|---|---|---|---|
| Liquid crystal composition | Liquid crystal composition 9 | Liquid crystal composition 9 | Liquid crystal composition 9 | Liquid crystal composition 9 | Liquid crystal composition 9 | Liquid crystal composition 9 | Liquid crystal composition 9 |
| Color filter | Color filter 1 | Color filter 2 | Color filter 3 | Color filter 4 | Color filter 5 | Color filter 7 | Color filter 9 |
| VHR | 99.5 | 99.5 | 99.3 | 99.3 | 99.0 | 99.4 | 99.4 |
| ID | 28 | 23 | 64 | 62 | 80 | 43 | 50 |
| Image sticking | A | A | A | B | B | A | A |

In the liquid crystal display devices of Examples 43 to 63, high VHRs and low IDs were achieved. In the evaluation of image sticking, no residual image was observed or a residual image was slightly observed, which was at an acceptable level.

Examples 64 to 77

An electrode structure was formed on at least one of first and second substrates, and an alignment film having a horizontal alignment property was formed on each of surfaces of the first and second substrates facing each other. Then, a weak rubbing treatment was performed, an FFS cell was made, and liquid crystal compositions 10 and 11 described in Table 16 were sandwiched between the first substrate and the second substrate. Subsequently, liquid crystal display devices of Examples 64 to 77 were produced using the color filters 1 to 5, 7, and 9 listed in Table 2 ($d_{gap}$=4.0 μm, alignment film AL-1051). The VHR and ID of the produced liquid crystal display devices were measured. The image sticking of the produced liquid crystal display devices was also evaluated. Tables 17 and 18 show the results.

TABLE 16

| Name of compound | Content (%) |
|---|---|
| Liquid crystal composition 10 | |
| 3-Cy-Cy-1d0 | 39 |
| 3-Cy-Cy-1d1 | 7 |
| 0d1-Cy-Cy-Ph-1 | 11 |
| 2-Ph—Ph1—Ph-3 | 8 |
| 2-Ph—Ph1—Ph-5 | 8 |
| 3-Ph—Ph3—CFFO—Ph3—F | 10 |
| 3-Cy-Cy-Ph—Ph3-F | 6 |
| 4-Ph—Ph1—Ph3—CFFO—Ph3—F | 11 |
| $T_{ni}$/° C. | 76.0 |
| Δn | 0.114 |
| Δε | 6.0 |
| γ1/mPa·s | 77 |
| η/mPa·s | 13.3 |
| Liquid crystal composition 11 | |
| 3-Cy-Cy-1d0 | 44 |
| 3-Cy-Cy-1d1 | 3 |
| 2-Ph—Ph-3d1 | 13 |
| 3-Cy-Ph—Ph-2 | 7 |
| 2-Ph—Ph1—Ph-3 | 8 |
| 3-Ph—Ph1—Ph-3 | 7 |
| 3-Ph—Ph1—Ph3—CFFO—Ph3—F | 9 |
| 4-Cy-Cy-Ph1—CFFO—Ph3—F | 3 |
| 3-Cy-Ph3—Ph1—OCFFF | 6 |
| $T_{ni}$/° C. | 77.9 |
| Δn | 0.131 |
| Δε | 4.6 |

TABLE 16-continued

| Name of compound | Content (%) |
|---|---|
| $\gamma 1/\text{mPa} \cdot \text{s}$ | 74 |
| $\eta/\text{mPa} \cdot \text{s}$ | 12.4 |

TABLE 17

|  | Example 64 | Example 65 | Example 66 | Example 67 | Example 68 | Example 69 | Example 70 |
|---|---|---|---|---|---|---|---|
| Liquid crystal composition | Liquid crystal composition 10 | Liquid crystal composition 10 | Liquid crystal composition 10 | Liquid crystal composition 10 | Liquid crystal composition 10 | Liquid crystal composition 10 | Liquid crystal composition 10 |
| Color filter | Color filter 1 | Color filter 2 | Color filter 3 | Color filter 4 | Color filter 5 | Color filter 7 | Color filter 9 |
| VHR | 99.5 | 99.6 | 99.3 | 99.3 | 98.9 | 99.4 | 99.4 |
| ID | 20 | 18 | 41 | 42 | 59 | 29 | 34 |
| Image sticking | A | A | A | A | A | A | A |

TABLE 18

|  | Example 71 | Example 72 | Example 73 | Example 74 | Example 75 | Example 76 | Example 77 |
|---|---|---|---|---|---|---|---|
| Liquid crystal composition | Liquid crystal composition 11 | Liquid crystal composition 11 | Liquid crystal composition 11 | Liquid crystal composition 11 | Liquid crystal composition 11 | Liquid crystal composition 11 | Liquid crystal composition 11 |
| Color filter | Color filter 1 | Color filter 2 | Color filter 3 | Color filter 4 | Color filter 5 | Color filter 7 | Color filter 9 |
| VHR | 99.7 | 99.7 | 99.4 | 99.4 | 99.2 | 99.6 | 99.5 |
| ID | 19 | 16 | 40 | 42 | 59 | 27 | 35 |
| Image sticking | A | A | A | A | B | A | A |

In the liquid crystal display devices of Examples 64 to 77, high VHRs and low IDs were achieved. In the evaluation of image sticking, no residual image was observed or a residual image was slightly observed, which was at an acceptable level.

Examples 78 to 91

Liquid crystal compositions 12 and 13 listed in Table 19 were sandwiched as in Example 64. Liquid crystal display devices of Examples 78 to 91 were produced using the color filters 1 to 5, 7, and 9 listed in Table 2 and the VHR and ID were measured. The image sticking of the liquid crystal display devices was also evaluated. Tables 20 and 21 show the results.

TABLE 19

| Name of compound | Content (%) |
|---|---|
| Liquid crystal composition 12 | |
| 3-Cy-Cy-1d0 | 47 |
| 3-Cy-Cy-1d1 | 9 |
| 3-Cy-Cy-Ph-2 | 7 |
| 2-Ph—Ph1—Ph-3 | 4 |
| 2-Ph—Ph1—Ph-5 | 7 |
| 3-Cy-Ph—Ph-Cy-3 | 2 |
| 2-Ph—Ph1—Ph-3 | 6 |
| 3-Ph—Ph1—Ph-3 | 7 |
| 3-Ph—Ph3—CFFO—Ph3—F | 2 |
| 3-Cy-Cy-Ph1—Ph3—F | 2 |
| 3-Cy-Ph—Ph3—Ph1—OCFFF | 7 |
| $T_{ni}/°\text{C}.$ | 80.6 |
| $\Delta n$ | 0.122 |
| $\Delta\epsilon$ | 6.0 |
| $\gamma 1/\text{mPa} \cdot \text{s}$ | 65 |
| $\eta/\text{mPa} \cdot \text{s}$ | 11.1 |
| Liquid crystal composition 13 | |
| 3-Cy-Cy-1d0 | 10 |
| 3-Cy-Cy-1d1 | 6 |
| 3-Cy-Cy-1d1-F | 28 |
| 0d1-Cy-Cy-Ph-1 | 11 |
| 0d3-Cy-Cy-Ph-1 | 10 |
| 2-Ph—Ph1—Ph—3 | 10 |
| 2-Ph—Ph1—Ph—5 | 10 |
| 5-Cy-Ph—Ph1—Ph-2 | 2 |
| 3-Ph—Ph3—CFFO—Ph3—F | 7 |
| 3-Cy-Cy-Ph1—CFFO—Ph3—F | 6 |
| $T_{ni}/°\text{C}.$ | 80.0 |
| $\Delta n$ | 0.110 |
| $\Delta\epsilon$ | 5.9 |
| $\gamma 1/\text{mPa} \cdot \text{s}$ | 68 |
| $\eta/\text{mPa} \cdot \text{s}$ | 11.6 |

TABLE 20

| | Example 78 | Example 79 | Example 80 | Example 81 | Example 82 | Example 83 | Example 84 |
|---|---|---|---|---|---|---|---|
| Liquid crystal composition | Liquid crystal composition 12 | Liquid crystal composition 12 | Liquid crystal composition 12 | Liquid crystal composition 12 | Liquid crystal composition 12 | Liquid crystal composition 12 | Liquid crystal composition 12 |
| Color filter | Color filter 1 | Color filter 2 | Color filter 3 | Color filter 4 | Color filter 5 | Color filter 7 | Color filter 9 |
| VHR | 99.7 | 99.8 | 99.6 | 99.6 | 99.3 | 99.7 | 99.6 |
| ID | 19 | 13 | 44 | 44 | 70 | 29 | 37 |
| Image sticking | A | A | A | A | B | A | A |

TABLE 21

| | Example 85 | Example 86 | Example 87 | Example 88 | Example 89 | Example 90 | Example 91 |
|---|---|---|---|---|---|---|---|
| Liquid crystal composition | Liquid crystal composition 13 | Liquid crystal composition 13 | Liquid crystal composition 13 | Liquid crystal composition 13 | Liquid crystal composition 13 | Liquid crystal composition 13 | Liquid crystal composition 13 |
| Color filter | Color filter 1 | Color filter 2 | Color filter 3 | Color filter 4 | Color filter 5 | Color filter 7 | Color filter 9 |
| VHR | 99.6 | 99.6 | 99.3 | 99.3 | 99.2 | 99.5 | 99.4 |
| ID | 25 | 20 | 55 | 53 | 72 | 37 | 46 |
| Image sticking | A | A | B | B | B | A | A |

In the liquid crystal display devices of Examples 78 to 91, high VHRs and low IDs were achieved. In the evaluation of image sticking, no residual image was observed or a residual image was slightly observed, which was at an acceptable level.

Examples 92 to 98

A liquid crystal composition 14 was prepared by mixing 0.3 mass % of bismethacrylic acid biphenyl-4,4'-diyl with the liquid crystal composition 10 used in Example 64. The liquid crystal composition 14 was set in the TN cell. A polymerization treatment was performed by performing irradiation with ultraviolet rays (3.0 J/cm$^2$) for 600 seconds while applying a driving voltage between electrodes. Liquid crystal display devices of Examples 92 to 98 were then produced using the color filters 1 to 5, 7, and 9 listed in Table 2 and the VHR and ID were measured. The image sticking of the liquid crystal display devices was also evaluated. Table 22 shows the results.

In the liquid crystal display devices of Examples 92 to 98, high VHRs and low IDs were achieved. In the evaluation of image sticking, no residual image was observed or a residual image was slightly observed, which was at an acceptable level.

Examples 99 to 105

A liquid crystal composition 15 was prepared by mixing 0.3 mass % of bismethacrylic acid biphenyl-4,4'-diyl with the liquid crystal composition 8 used in Example 50. The liquid crystal composition 15 was set in the IPS cell. A polymerization treatment was performed by performing irradiation with ultraviolet rays (3.0 J/cm$^2$) for 600 seconds while applying a driving voltage between electrodes. Liquid crystal display devices of Examples 99 to 105 were then produced using the color filters 1 to 5, 7, and 9 listed in Table 2 and the VHR and ID were measured. The image sticking of the liquid crystal display devices was also evaluated. Table 23 shows the results.

TABLE 22

| | Example 92 | Example 93 | Example 94 | Example 95 | Example 96 | Example 97 | Example 98 |
|---|---|---|---|---|---|---|---|
| Liquid crystal composition | Liquid crystal composition 14 | Liquid crystal composition 14 | Liquid crystal composition 14 | Liquid crystal composition 14 | Liquid crystal composition 14 | Liquid crystal composition 14 | Liquid crystal composition 14 |
| Color filter | Color filter 1 | Color filter 2 | Color filter 3 | Color filter 4 | Color filter 5 | Color filter 7 | Color filter 9 |
| VHR | 99.6 | 99.7 | 99.4 | 99.4 | 99.1 | 99.6 | 99.5 |
| ID | 19 | 14 | 42 | 43 | 65 | 26 | 33 |
| Image sticking | A | A | A | A | B | A | A |

TABLE 23

|  | Example 99 | Example 100 | Example 101 | Example 102 | Example 103 | Example 104 | Example 105 |
|---|---|---|---|---|---|---|---|
| Liquid crystal composition | Liquid crystal composition 15 | Liquid crystal composition 15 | Liquid crystal composition 15 | Liquid crystal composition 15 | Liquid crystal composition 15 | Liquid crystal composition 15 | Liquid crystal composition 15 |
| Color filter | Color filter 1 | Color filter 2 | Color filter 3 | Color filter 4 | Color filter 5 | Color filter 7 | Color filter 9 |
| VHR | 99.5 | 99.6 | 99.4 | 99.3 | 99.1 | 99.5 | 99.5 |
| ID | 25 | 19 | 48 | 49 | 60 | 31 | 39 |
| Image sticking | A | A | A | A | B | A | A |

In the liquid crystal display devices of Examples 99 to 105, high VHRs and low IDs were achieved. In the evaluation of image sticking, no residual image was observed or a residual image was slightly observed, which was at an acceptable level.

Examples 106 to 112

A liquid crystal composition 16 was prepared by mixing 0.3 mass % of bismethacrylic acid 3-fluorobiphenyl-4,4'-diyl with the liquid crystal composition 6 used in Example 36. The liquid crystal composition 16 was set in the FFS cell. A polymerization treatment was performed by performing irradiation with ultraviolet rays (3.0 J/cm$^2$) for 600 seconds while applying a driving voltage between electrodes. Liquid crystal display devices of Examples 106 to 112 were then produced using the color filters 1 to 5, 7, and 9 listed in Table 2 and the VHR and ID were measured. The image sticking of the liquid crystal display devices was also evaluated. Table 24 shows the results.

TABLE 24

|  | Example 106 | Example 107 | Example 108 | Example 109 | Example 110 | Example 111 | Example 112 |
|---|---|---|---|---|---|---|---|
| Liquid crystal composition | Liquid crystal composition 16 | Liquid crystal composition 16 | Liquid crystal composition 16 | Liquid crystal composition 16 | Liquid crystal composition 16 | Liquid crystal composition 16 | Liquid crystal composition 16 |
| Color filter | Color filter 1 | Color filter 2 | Color filter 3 | Color filter 4 | Color filter 5 | Color filter 7 | Color filter 9 |
| VHR | 99.5 | 99.5 | 99.3 | 99.3 | 99.0 | 99.4 | 99.4 |
| ID | 27 | 23 | 54 | 56 | 76 | 40 | 48 |
| Image sticking | A | A | B | B | B | A | A |

In the liquid crystal display devices of Examples 106 to 112, high VHRs and low IDs were achieved. In the evaluation of image sticking, no residual image was observed or a residual image was slightly observed, which was at an acceptable level.

Examples 113 to 119

A liquid crystal composition 17 listed in Table 25 was sandwiched as in Example 64. Liquid crystal display devices of Examples 113 to 119 were produced using the color filters 1 to 5, 7, and 9 listed in Table 2 and the VHR and ID were measured. The image sticking of the liquid crystal display devices was also evaluated. Table 26 shows the results.

TABLE 25

| Liquid crystal composition 17 | |
|---|---|
| Name of compound | Content (%) |
| 3-Cy-Cy-1d0 | 30 |
| 3-Cy-Cy-1d1 | 7 |
| 3-Cy-Ph—O2 | 5 |
| 5-Cy-Ph—O2 | 5 |
| 0d1-Cy-Cy-Ph-1 | 10 |
| 2-Ph—Ph1—Ph-3 | 8 |
| 2-Ph—Ph1—Ph-5 | 8 |
| 3-Ph—Ph3—CFFO—Ph3—F | 10 |
| 3-Cy-Cy-Ph—Ph3—F | 6 |
| 4-Ph—Ph1—Ph3—CFFO—Ph3—F | 11 |
| $T_{ni}$/° C. | 74.0 |
| Δn | 0.121 |
| Δε | 6.3 |
| γ1/mPa · s | 89 |
| η/mPa · s | 18.5 |

TABLE 26

|  | Example 113 | Example 114 | Example 115 | Example 116 | Example 117 | Example 118 | Example 119 |
|---|---|---|---|---|---|---|---|
| Liquid crystal composition | Liquid crystal composition 17 | Liquid crystal composition 17 | Liquid crystal composition 17 | Liquid crystal composition 17 | Liquid crystal composition 17 | Liquid crystal composition 17 | Liquid crystal composition 17 |
| Color filter | Color filter 1 | Color filter 2 | Color filter 3 | Color filter 4 | Color filter 5 | Color filter 7 | Color filter 9 |
| VHR | 99.6 | 99.6 | 99.4 | 99.4 | 99.1 | 99.5 | 99.5 |
| ID | 20 | 19 | 54 | 52 | 72 | 37 | 43 |
| Image sticking | A | A | B | B | B | A | A |

In the liquid crystal display devices of Examples 113 to 119, high VHRs and low IDs were achieved. In the evaluation of image sticking, no residual image was observed or a residual image was slightly observed, which was at an acceptable level.

were measured. The image sticking of the liquid crystal display devices was also evaluated. Table 28 shows the results.

[Chem. 22]

| Chemical structure | Proportion | Abbreviation |
|---|---|---|
| $C_4H_9$—Cy—COO—Ph—$CH_3$ | 27% | 4-Cy—VO—Ph-1 |
| $C_5H_{11}$—Cy—COO—Ph—$CH_3$ | 20% | 5-Cy—VO—Ph-1 |
| $C_5H_{11}$—Cy—COO—Ph—$C_3H_7$ | 20% | 5-Cy—VO—Ph-3 |
| $C_3H_7$—Ph—Ph(F,F)—$CF_2O$—Ph(F,F,F)—F | 8% | 3-Ph—Ph3—CFFO—Ph3—F |
| $C_3H_7$—Cy—Cy—$CF_2O$—Ph(F,F,F)—F | 13% | 3-Cy—Cy—CFFO—Ph3—F |
| $C_3H_7$—Ph—Ph(F)—Ph(F,F)—$CF_2O$—Ph(F,F,F)—F | 12% | 3-Ph—Ph1—Ph3—CFFO—Ph3—F |

Comparative Examples 1 to 7

A comparative liquid crystal composition 1 described below was set in the IPS cell used in Example 1. Table 27 shows the physical properties of the comparative liquid crystal composition. Liquid crystal display devices of Comparative Examples 1 to 7 were produced using the color filters 1 to 5, 7, and 9 listed in Table 2 and the VHR and ID

TABLE 27

| $T_{NI}/°C.$ | 69.3 |
|---|---|
| $\Delta n$ | 0.096 |
| $n_o$ | 1.484 |
| $\epsilon_\perp$ | 5.5 |
| $\Delta\epsilon$ | 4.8 |
| $\eta/mPa \cdot s$ | 30.3 |

TABLE 28

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Liquid crystal composition | Comparative liquid crystal composition 1 | Comparative liquid crystal composition 1 | Comparative liquid crystal composition 1 | Comparative liquid crystal composition 1 | Comparative liquid crystal composition 1 | Comparative liquid crystal composition 1 | Comparative liquid crystal composition 1 |
| Color filter | Color filter 1 | Color filter 2 | Color filter 3 | Color filter 4 | Color filter 5 | Color filter 7 | Color filter 9 |
| VHR | 98.0 | 98.2 | 97.4 | 97.4 | 97.1 | 97.7 | 97.5 |
| ID | 152 | 144 | 183 | 185 | 212 | 164 | 176 |
| Image sticking | D | C | D | D | D | D | D |

In the liquid crystal display devices of Comparative Examples 1 to 7, the VHRs were decreased and the IDs were increased compared with the liquid crystal display devices of the present invention. In the evaluation of image sticking, a residual image was observed, which was at an unacceptable level.

Comparative Examples 8 to 21

Comparative liquid crystal compositions 2 and 3 listed in Table 29 were sandwiched as in Example 1. Liquid crystal display devices of Comparative Examples 8 to 21 were produced using the color filters 1 to 5, 7, and 9 listed in Table 2 and the VHR and ID were measured. The image sticking of the liquid crystal display devices was also evaluated. Tables 30 and 31 show the results.

TABLE 29

| Name of compound | Content (%) |
|---|---|
| Comparative liquid crystal composition 2 | |
| 2-Cy-Cy-Ph3—F | 12 |
| 3-Cy-Cy-Ph3—F | 10 |
| 5-Cy-Cy-Ph3—F | 6 |
| 2-Cy-Cy-Ph—OCFFF | 9 |
| 3-Cy-Cy-Ph—OCFFF | 8 |
| 4-Cy-Cy-Ph—OCFFF | 7 |
| 2-Cy-Ph1—Ph3—F | 12 |
| 3-Cy-Ph1—Ph3—F | 10 |
| 2-Cy-Py-Cy-CFFO—Ph3—F | 5.5 |
| 2-Ph—Ph1—Ph3—F | 5.5 |
| 0d1-Cy-Cy-CFFO—Ph3—F | 15 |
| $T_{ni}/°C.$ | 75.7 |
| $\Delta n$ | 0.093 |
| $\gamma 1/mPa \cdot s$ | 146 |
| Comparative liquid crystal composition 3 | |
| 2-Cy-Cy-Ph3—F | 12 |
| 3-Cy-Cy-Ph3—F | 10 |
| 2-Cy-Cy-Ph—OCFFF | 8 |
| 3-Cy-Cy-Ph—OCFFF | 8 |
| 4-Cy-Cy-Ph—OCFFF | 7 |
| 5-Cy-Cy-Ph—OCFFF | 4 |
| 2-Cy-Ph1—Ph3—F | 12 |
| 3-Cy-Ph1—Ph3—F | 4 |
| 2-Cy-Cy-CFFO—Ph3—F | 12 |
| 2-Ph—Ph1—Ph3—F | 8 |
| 0d1-Cy-Cy-CFFO—Ph3—F | 15 |
| $T_{ni}/°C.$ | 75.0 |
| $\Delta n$ | 0.093 |
| $\gamma 1/mPa \cdot s$ | 139 |

TABLE 30

|  | Comparative Example 8 | Comparative Example 9 | Comparative Example 10 | Comparative Example 11 | Comparative Example 12 | Comparative Example 13 | Comparative Example 14 |
|---|---|---|---|---|---|---|---|
| Liquid crystal composition | Comparative liquid crystal composition 2 | Comparative liquid crystal composition 2 | Comparative liquid crystal composition 2 | Comparative liquid crystal composition 2 | Comparative liquid crystal composition 2 | Comparative liquid crystal composition 2 | Comparative liquid crystal composition 2 |
| Color filter | Color filter 1 | Color filter 2 | Color filter 3 | Color filter 4 | Color filter 5 | Color filter 7 | Color filter 9 |
| VHR | 98.2 | 98.3 | 97.7 | 97.7 | 97.4 | 98.0 | 97.9 |
| ID | 149 | 141 | 177 | 178 | 201 | 160 | 169 |
| Image sticking | C | C | D | D | D | D | D |

TABLE 31

|  | Comparative Example 15 | Comparative Example 16 | Comparative Example 17 | Comparative Example 18 | Comparative Example 19 | Comparative Example 20 | Comparative Example 21 |
|---|---|---|---|---|---|---|---|
| Liquid crystal composition | Comparative liquid crystal composition 3 | Comparative liquid crystal composition 3 | Comparative liquid crystal composition 3 | Comparative liquid crystal composition 3 | Comparative liquid crystal composition 3 | Comparative liquid crystal composition 3 | Comparative liquid crystal composition 3 |
| Color filter | Color filter 1 | Color filter 2 | Color filter 3 | Color filter 4 | Color filter 5 | Color filter 7 | Color filter 9 |
| VHR | 98.3 | 98.4 | 97.6 | 97.6 | 97.3 | 98.0 | 97.8 |
| ID | 151 | 142 | 182 | 180 | 206 | 163 | 170 |
| Image sticking | C | C | D | D | D | D | D |

In the liquid crystal display devices of Comparative Examples 8 to 21, the VHRs were decreased and the IDs were increased compared with the liquid crystal display devices of the present invention. In the evaluation of image sticking, a residual image was observed, which was at an unacceptable level.

Comparative Examples 22 to 35

Comparative liquid crystal compositions 4 and 5 listed in Table 32 were sandwiched as in Example 1. Liquid crystal display devices of Comparative Examples 22 to 35 were produced using the color filters 1 to 5, 7, and 9 listed in Table 2 and the VHR and ID were measured. The image sticking of the liquid crystal display devices was also evaluated. Tables 33 and 34 show the results.

TABLE 32

| Name of compound | Content (%) |
|---|---|
| Comparative liquid crystal composition 4 | |
| 4-Cy-Cy-1d0 | 15 |
| 0d1-Cy-Cy-Ph-1 | 4 |

TABLE 32-continued

| Name of compound | Content (%) |
|---|---|
| 0d3-Cy-Cy-Ph-1 | 14 |
| 3-Cy-Ph—Ph-Cy-3 | 3 |
| 3-Cy-Ph—Ph1-Cy-3 | 4 |
| 1-Cy-Cy-Ph3—F | 9 |
| 2-Cy-Cy-Ph3—F | 10 |
| 3-Cy-Cy-Ph3—F | 10 |
| 5-Cy-Cy-Ph3—F | 5 |
| 3-Cy-Ph1—Ph3—F | 8 |
| 5-Cy-Ph1—Ph3—F | 7 |
| 3-Ph—Ph1—Ph3—F | 3 |
| 3-Cy-Cy-Ph1—Ph3—F | 8 |
| $T_{ni}$/° C. | 101.0 |
| $\Delta n$ | 0.095 |
| $\Delta \epsilon$ | 8.2 |
| $\gamma 1$/mPa·s | 115 |
| $\eta$/mPa·s | 23.6 |
| Comparative liquid crystal composition 5 | |
| 2-Cy-Cy-1d0 | 32 |
| 0d1-Cy-Cy-Ph-1 | 4 |
| 2-Ph—Ph1—Ph-3 | 10 |
| 2-Ph—Ph1—Ph-5 | 11 |
| 3-Ph—Ph1—Ph-5 | 7 |
| 2-Cy-Cy-Ph—F | 6 |
| 3-Cy-Cy-Ph—F | 21 |
| 5-Cy-Ph—Ph—F | 7 |
| 3-Cy-Ph—Ph3—F | 2 |
| $T_{ni}$/° C. | 77.2 |
| $\Delta n$ | 0.135 |
| $\Delta \epsilon$ | 4.5 |
| $\gamma 1$/mPa·s | 57 |
| $\eta$/mPa·s | 10.5 |

TABLE 33

| | Comparative Example 22 | Comparative Example 23 | Comparative Example 24 | Comparative Example 25 | Comparative Example 26 | Comparative Example 27 | Comparative Example 28 |
|---|---|---|---|---|---|---|---|
| Liquid crystal composition | Comparative liquid crystal composition 4 | Comparative liquid crystal composition 4 | Comparative liquid crystal composition 4 | Comparative liquid crystal composition 4 | Comparative liquid crystal composition 4 | Comparative liquid crystal composition 4 | Comparative liquid crystal composition 4 |
| Color filter | Color filter 1 | Color filter 2 | Color filter 3 | Color filter 4 | Color filter 5 | Color filter 7 | Color filter 9 |
| VHR | 98.1 | 98.3 | 97.6 | 97.6 | 97.4 | 97.9 | 97.8 |
| ID | 154 | 148 | 184 | 185 | 214 | 170 | 176 |
| Image sticking | D | C | D | D | D | D | D |

TABLE 34

| | Comparative Example 29 | Comparative Example 30 | Comparative Example 31 | Comparative Example 32 | Comparative Example 33 | Comparative Example 34 | Comparative Example 35 |
|---|---|---|---|---|---|---|---|
| Liquid crystal composition | Comparative liquid crystal composition 5 | Comparative liquid crystal composition 5 | Comparative liquid crystal composition 5 | Comparative liquid crystal composition 5 | Comparative liquid crystal composition 5 | Comparative liquid crystal composition 5 | Comparative liquid crystal composition 5 |
| Color filter | Color filter 1 | Color filter 2 | Color filter 3 | Color filter 4 | Color filter 5 | Color filter 7 | Color filter 9 |
| VHR | 98.0 | 98.1 | 97.6 | 97.6 | 97.2 | 97.9 | 97.8 |
| ID | 145 | 139 | 169 | 170 | 197 | 153 | 161 |
| Image sticking | C | C | D | D | D | D | D |

In the liquid crystal display devices of Comparative Examples 22 to 35, the VHRs were decreased and the IDs were increased compared with the liquid crystal display devices of the present invention. In the evaluation of image sticking, a residual image was observed, which was at an unacceptable level.

Comparative Examples 36 to 56

Comparative liquid crystal compositions 6 to 8 listed in Table 35 were sandwiched as in Example 1. Liquid crystal display devices of Comparative Examples 36 to 56 were produced using the color filters 1 to 5, 7, and 9 listed in Table 2 and the VHR and ID were measured. The image sticking of the liquid crystal display devices was also evaluated. Tables 36 to 38 show the results.

TABLE 35

| Name of compound | Content (%) |
|---|---|
| Comparative liquid crystal composition 6 | |
| 4-Cy-Cy-1d0 | 18 |
| 3-Cy-Cy-4 | 15 |
| 0d1-Cy-Cy-Ph-1 | 8 |
| 2-Ph—Ph1—Ph-3 | 10 |
| 2-Ph—Ph1—Ph-5 | 6 |
| 3-Ph—Ph1—Ph-5 | 6 |
| 2-Cy-Cy-Ph—F | 6 |
| 3-Cy-Cy-Ph—F | 10 |
| 5-Cy-Ph—Ph—F | 7 |
| 3-Cy-Ph—Ph3—F | 14 |
| $T_{ni}/°C.$ | 73.5 |
| $\Delta n$ | 0.126 |
| $\Delta \epsilon$ | 4.9 |
| $\gamma 1/mPa \cdot s$ | 94 |
| $\eta/mPa \cdot s$ | 16.9 |

TABLE 35-continued

| Name of compound | Content (%) |
|---|---|
| Comparative liquid crystal composition 7 | |
| 4-Cy-Cy-1d0 | 18 |
| 3-Cy-Cy-4 | 15 |
| 0d1-Cy-Cy-Ph-1 | 8 |
| 2-Ph—Ph1—Ph-3 | 10 |
| 2-Ph—Ph1—Ph-5 | 6 |
| 3-Ph—Ph1—Ph-5 | 5 |
| 2-Cy-Cy-Ph—F | 6 |
| 3-Cy-Cy-Ph—F | 5 |
| 5-Cy-Ph—Ph—F | 7 |
| 3-Cy-Ph—Ph3—F | 15 |
| 3-Cy-Cy-Ph1—Ph3—F | 5 |
| $T_{ni}/°C.$ | 75.7 |
| $\Delta n$ | 0.125 |
| $\Delta \epsilon$ | 5.5 |
| $\gamma 1/mPa \cdot s$ | 103 |
| $\eta/mPa \cdot s$ | 18.4 |
| Comparative liquid crystal composition 8 | |
| 4-Cy-Cy-1d0 | 17 |
| 3-Cy-Cy-4 | 15 |
| 0d3-Cy-Cy-Ph-1 | 8 |
| 3-Cy-Ph—Ph-2 | 10 |
| 2-Ph—Ph1—Ph-5 | 7 |
| 3-Ph—Ph1—Ph-5 | 7 |
| 2-Cy-Cy-Ph—F | 6 |
| 3-Cy-Cy-Ph—F | 5 |
| 5-Cy-Ph—Ph—F | 7 |
| 3-Cy-Ph—Ph3—F | 14 |
| 3-Cy-Cy-Ph1—Ph3—F | 4 |
| $T_{ni}/°C.$ | 85.3 |
| $\Delta n$ | 0.128 |
| $\Delta \epsilon$ | 4.8 |
| $\gamma 1/mPa \cdot s$ | 107 |
| $\eta/mPa \cdot s$ | 19.0 |

TABLE 36

| | Comparative Example 36 | Comparative Example 37 | Comparative Example 38 | Comparative Example 39 | Comparative Example 40 | Comparative Example 41 | Comparative Example 42 |
|---|---|---|---|---|---|---|---|
| Liquid crystal composition | Comparative liquid crystal composition 6 | Comparative liquid crystal composition 6 | Comparative liquid crystal composition 6 | Comparative liquid crystal composition 6 | Comparative liquid crystal composition 6 | Comparative liquid crystal composition 6 | Comparative liquid crystal composition 6 |
| Color filter | Color filter 1 | Color filter 2 | Color filter 3 | Color filter 4 | Color filter 5 | Color filter 7 | Color filter 9 |
| VHR | 98.1 | 98.2 | 97.6 | 97.6 | 97.1 | 97.8 | 97.8 |
| ID | 138 | 130 | 172 | 174 | 208 | 147 | 155 |
| Image sticking | C | C | D | D | D | D | D |

TABLE 37

| | Comparative Example 43 | Comparative Example 44 | Comparative Example 45 | Comparative Example 46 | Comparative Example 47 | Comparative Example 48 | Comparative Example 49 |
|---|---|---|---|---|---|---|---|
| Liquid crystal composition | Comparative liquid crystal composition 7 | Comparative liquid crystal composition 7 | Comparative liquid crystal composition 7 | Comparative liquid crystal composition 7 | Comparative liquid crystal composition 7 | Comparative liquid crystal composition 7 | Comparative liquid crystal composition 7 |
| Color filter | Color filter 1 | Color filter 2 | Color filter 3 | Color filter 4 | Color filter 5 | Color filter 7 | Color filter 9 |
| VHR | 98.3 | 98.3 | 97.8 | 97.8 | 97.3 | 98.2 | 98.1 |
| ID | 144 | 139 | 175 | 173 | 201 | 154 | 164 |
| Image sticking | C | C | D | D | D | D | D |

TABLE 38

|  | Comparative Example 50 | Comparative Example 51 | Comparative Example 52 | Comparative Example 53 | Comparative Example 54 | Comparative Example 55 | Comparative Example 56 |
|---|---|---|---|---|---|---|---|
| Liquid crystal composition | Comparative liquid crystal composition 8 | Comparative liquid crystal composition 8 | Comparative liquid crystal composition 8 | Comparative liquid crystal composition 8 | Comparative liquid crystal composition 8 | Comparative liquid crystal composition 8 | Comparative liquid crystal composition 8 |
| Color filter | Color filter 1 | Color filter 2 | Color filter 3 | Color filter 4 | Color filter 5 | Color filter 7 | Color filter 9 |
| VHR | 98.4 | 98.6 | 97.5 | 97.6 | 97.3 | 98.1 | 97.9 |
| ID | 133 | 129 | 170 | 174 | 224 | 151 | 163 |
| Image sticking | D | C | D | D | D | D | D |

In the liquid crystal display devices of Comparative Examples 36 to 56, the VHRs were decreased and the IDs were increased compared with the liquid crystal display devices of the present invention. In the evaluation of image sticking, a residual image was observed, which was at an unacceptable level.

Comparative Examples 57 to 77

Comparative liquid crystal compositions 9 to 11 listed in Table 39 were sandwiched as in Example 1. Liquid crystal display devices of Comparative Examples 57 to 77 were produced using the color filters 1 to 5, 7, and 9 listed in Table 2 and the VHR and ID were measured. The image sticking of the liquid crystal display devices was also evaluated. Tables 40 to 42 show the results.

TABLE 39

| Name of compound | Content (%) |
|---|---|
| Comparative liquid crystal composition 9 | |
| 2-Cy-Cy-Ph3—F | 10 |
| 0d1-Cy-Cy-Ph1—F | 8 |
| 2-Ph—Ph3—CFFO—Ph3—F | 4 |
| 3-Cy-Cy-Ph3—F | 10 |
| 2-Ph—Ph3—CFFO—Ph3—F | 6 |
| 3-Cy-Cy-Ph1—Ph3—F | 8 |
| 1-Cy-Cy-Ph3—F | 9 |
| 5-Cy-Cy-Ph3—F | 5 |
| 0d3-Ph-T-Ph-3d0 | 15 |
| 3-Cy-Ph-T-Ph-2 | 14 |
| 0d3-Ph—N—Ph-3d0 | 4 |
| 3-Ph—VO-Cy-VO—Ph-3 | 4 |
| 3-Cy-Cy-VO—Ph-Cy-3 | 3 |
| $T_{ni}/°C.$ | 101.6 |
| $\Delta n$ | 0.153 |
| $\Delta\epsilon$ | 9.2 |
| $\gamma1/mPa \cdot s$ | 101 |
| $\eta/mPa \cdot s$ | 23.7 |
| Comparative liquid crystal composition 10 | |
| 2-Cy-Cy-Ph3—F | 10 |
| 0d1-Cy-Cy-Ph1—F | 8 |
| 2-Ph—Ph3—CFFO—Ph3—F | 4 |
| 3-Cy-Cy-Ph3—F | 10 |
| 2-Ph—Ph3—CFFO—Ph3—F | 6 |
| 3-Cy-Cy-Ph1—Ph3—F | 8 |
| 1-Cy-Cy-Ph3—F | 9 |
| 5-Cy-Cy-Ph3—F | 5 |
| 0d3-Ph-T-Ph-3d0 | 10 |
| 3-Cy-Ph3-T-Ph9-1 | 4 |
| 4-Ph-T-Ph—O2 | 4 |
| 3-Cy-Ph-T-Ph-2 | 7 |
| 5-Cy-VO—Ph-1 | 5 |
| 3-Ph—VO-Cy-VO—Ph-3 | 7 |
| 3-Cy-Cy-VO—Ph-Cy-3 | 3 |
| $T_{ni}/°C.$ | 96.4 |
| $\Delta n$ | 0.137 |
| $\Delta\epsilon$ | 8.8 |

TABLE 39-continued

| Name of compound | Content (%) |
|---|---|
| $\gamma1/mPa \cdot s$ | 90 |
| $\eta/mPa \cdot s$ | 25.9 |
| Comparative liquid crystal composition 11 | |
| 2-Cy-Cy-Ph3—F | 10 |
| 0d1-Cy-Cy-Ph1—F | 8 |
| 3-Cy-Cy-Ph3—F | 10 |
| 2-Ph—Ph3—CFFO—Ph3—F | 6 |
| 3-Cy-Cy-Ph1—Ph3—F | 8 |
| 5-Cy-Cy-Ph3—F | 5 |
| 0d3-Ph-T-Ph-3d0 | 10 |
| 3-Cy-Ph3-T-Ph9-1 | 4 |
| 3-Cy-Cy-CFFO—Ph3—F | 4 |
| 4-Ph-T-Ph—O2 | 4 |
| 5-Cy-Cy-CFFO—Ph3—F | 9 |
| 5-Cy-VO—Ph-1 | 5 |
| 0d3-Ph—N—Ph-3d0 | 7 |
| 3-Ph—VO-Cy-VO—Ph-3 | 7 |
| 3-Cy-Cy-VO—Ph-Cy-3 | 3 |
| $T_{ni}/°C.$ | 99.2 |
| $\Delta n$ | 0.136 |
| $\Delta\epsilon$ | 7.8 |
| $\gamma1/mPa \cdot s$ | 105 |
| $\eta/mPa \cdot s$ | 26.6 |

TABLE 40

|  | Comparative Example 57 | Comparative Example 58 | Comparative Example 59 | Comparative Example 60 | Comparative Example 61 | Comparative Example 62 | Comparative Example 63 |
|---|---|---|---|---|---|---|---|
| Liquid crystal composition | Comparative liquid crystal composition 9 | Comparative liquid crystal composition 9 | Comparative liquid crystal composition 9 | Comparative liquid crystal composition 9 | Comparative liquid crystal composition 9 | Comparative liquid crystal composition 9 | Comparative liquid crystal composition 9 |
| Color filter | Color filter 1 | Color filter 2 | Color filter 3 | Color filter 4 | Color filter 5 | Color filter 7 | Color filter 9 |
| VHR | 98.3 | 98.4 | 97.9 | 97.9 | 97.4 | 98.2 | 97.2 |
| ID | 149 | 145 | 179 | 181 | 209 | 162 | 172 |
| Image sticking | D | C | D | D | D | D | D |

TABLE 41

|  | Comparative Example 64 | Comparative Example 65 | Comparative Example 66 | Comparative Example 67 | Comparative Example 68 | Comparative Example 69 | Comparative Example 70 |
|---|---|---|---|---|---|---|---|
| Liquid crystal composition | Comparative liquid crystal composition 10 | Comparative liquid crystal composition 10 | Comparative liquid crystal composition 10 | Comparative liquid crystal composition 10 | Comparative liquid crystal composition 10 | Comparative liquid crystal composition 10 | Comparative liquid crystal composition 10 |
| Color filter | Color filter 1 | Color filter 2 | Color filter 3 | Color filter 4 | Color filter 5 | Color filter 7 | Color filter 9 |
| VHR | 98.2 | 98.3 | 97.8 | 97.7 | 97.3 | 98.1 | 98.0 |
| ID | 154 | 148 | 176 | 177 | 205 | 160 | 168 |
| Image sticking | C | C | D | D | D | D | D |

TABLE 42

|  | Comparative Example 71 | Comparative Example 72 | Comparative Example 73 | Comparative Example 74 | Comparative Example 75 | Comparative Example 76 | Comparative Example 77 |
|---|---|---|---|---|---|---|---|
| Liquid crystal composition | Comparative liquid crystal composition 11 | Comparative liquid crystal composition 11 | Comparative liquid crystal composition 11 | Comparative liquid crystal composition 11 | Comparative liquid crystal composition 11 | Comparative liquid crystal composition 11 | Comparative liquid crystal composition 11 |
| Color filter | Color filter 1 | Color filter 2 | Color filter 3 | Color filter 4 | Color filter 5 | Color filter 7 | Color filter 9 |
| VHR | 98.1 | 98.2 | 97.7 | 97.7 | 97.2 | 97.9 | 97.8 |
| ID | 150 | 145 | 170 | 172 | 202 | 159 | 163 |
| Image sticking | D | C | D | D | D | D | D |

In the liquid crystal display devices of Comparative Examples 57 to 77, the VHRs were decreased and the IDs were increased compared with the liquid crystal display devices of the present invention. In the evaluation of image sticking, a residual image was observed, which was at an unacceptable level.

Comparative Examples 78 to 101

Liquid crystal display devices of Comparative Examples 78 to 101 were produced in the same manner, except that the color filters 6, 8, and 10 listed in Table 2 were used instead of the color filter 1 in Examples 8, 22, 29, 43, 64, 78, 99, and 106. The VHR and ID were measured. The image sticking of the liquid crystal display devices was also evaluated. Tables 43 to 45 show the results.

TABLE 43

|  | Comparative Example 78 | Comparative Example 79 | Comparative Example 80 | Comparative Example 81 | Comparative Example 82 | Comparative Example 83 | Comparative Example 84 | Comparative Example 85 |
|---|---|---|---|---|---|---|---|---|
| Liquid crystal composition | Liquid crystal composition 2 | Liquid crystal composition 4 | Liquid crystal composition 5 | Liquid crystal composition 7 | Liquid crystal composition 10 | Liquid crystal composition 12 | Liquid crystal composition 15 | Liquid crystal composition 16 |
| Color filter | Color filter 6 | Color filter 6 | Color filter 6 | Color filter 6 | Color filter 6 | Color filter 6 | Color filter 6 | Color filter 6 |
| VHR | 98.5 | 98.4 | 98.3 | 98.3 | 98.1 | 98.5 | 98.3 | 98.1 |
| ID | 114 | 102 | 109 | 118 | 106 | 116 | 105 | 126 |
| Image sticking | D | C | C | D | D | D | D | D |

TABLE 44

|  | Comparative Example 86 | Comparative Example 87 | Comparative Example 88 | Comparative Example 89 | Comparative Example 90 | Comparative Example 91 | Comparative Example 92 | Comparative Example 93 |
|---|---|---|---|---|---|---|---|---|
| Liquid crystal composition | Liquid crystal composition 2 | Liquid crystal composition 4 | Liquid crystal composition 5 | Liquid crystal composition 7 | Liquid crystal composition 10 | Liquid crystal composition 12 | Liquid crystal composition 15 | Liquid crystal composition 16 |
| Color filter | Color filter 8 | Color filter 8 | Color filter 8 | Color filter 8 | Color filter 8 | Color filter 8 | Color filter 8 | Color filter 8 |
| VHR | 98.5 | 98.4 | 98.4 | 98.3 | 98.1 | 98.6 | 98.3 | 98.2 |
| ID | 110 | 98 | 102 | 115 | 101 | 112 | 100 | 122 |
| Image sticking | C | C | D | D | D | D | D | D |

TABLE 45

|  | Comparative Example 94 | Comparative Example 95 | Comparative Example 96 | Comparative Example 97 | Comparative Example 98 | Comparative Example 99 | Comparative Example 100 | Comparative Example 101 |
|---|---|---|---|---|---|---|---|---|
| Liquid crystal composition | Liquid crystal composition 2 | Liquid crystal composition 4 | Liquid crystal composition 5 | Liquid crystal composition 7 | Liquid crystal composition 10 | Liquid crystal composition 12 | Liquid crystal composition 15 | Liquid crystal composition 16 |
| Color filter | Color filter 10 | Color filter 10 | Color filter 10 | Color filter 10 | Color filter 10 | Color filter 10 | Color filter 10 | Color filter 10 |
| VHR | 98.5 | 98.3 | 98.3 | 98.3 | 98.0 | 98.4 | 98.3 | 98.1 |
| ID | 118 | 111 | 117 | 121 | 113 | 125 | 113 | 135 |
| Image sticking | D | D | D | D | D | D | D | D |

In the liquid crystal display devices of Comparative Examples 78 to 101, the VHRs were decreased and the IDs were increased compared with the liquid crystal display devices of the present invention. In the evaluation of image sticking, a residual image was observed, which was at an unacceptable level.

The invention claimed is:

1. A liquid crystal display device comprising a first substrate, a second substrate, a liquid crystal composition layer sandwiched between the first substrate and the second substrate, a color filter constituted by a black matrix and at least RGB three-color pixel portions, a pixel electrode, and a common electrode, wherein the liquid crystal composition layer contains a liquid crystal composition that contains one or more compounds represented by general formula (I),

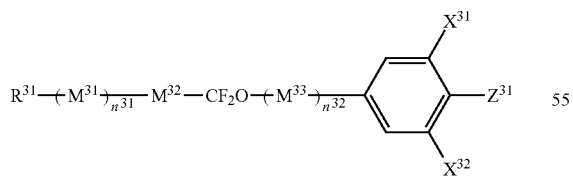
(I)

(in the formula, $R^{31}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group, one or two —$CH_2$— in the trans-1,4-cyclohexylene group may be substituted with —O— as long as oxygen atoms are not directly adjacent to each other, and one or two hydrogen atoms in the phenylene group may be substituted with fluorine atoms; $X^{31}$ and $X^{32}$ each independently represent a hydrogen atom or a fluorine atom; $Z^{31}$ represents a fluorine atom, a trifluoromethoxy group, or a trifluoromethyl group; $n^{31}$ and $n^{32}$ each independently represent 0, 1, or 2 and $n^{31}+n^{32}$ is 0, 1, or 2; and when a plurality of $M^{31}$ and $M^{33}$ are present, the plurality of $M^{31}$ may be the same or different and the plurality of $M^{33}$ may be the same or different) and that contains one or more compounds selected from the group consisting of compounds represented by general formula (II-a) to general formula (II-f),

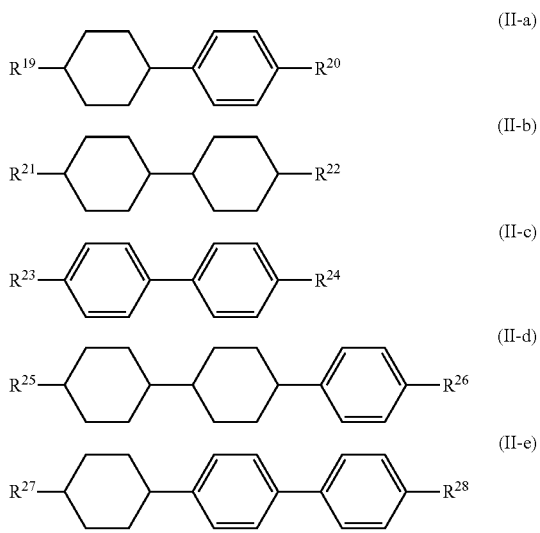

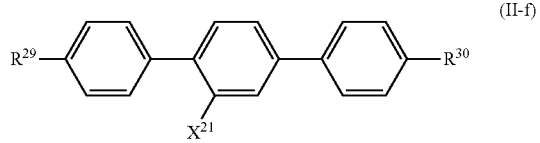

(II-f)

(in the formulae, $R^{19}$ to $R^{30}$ each independently represent an alkyl group having 1 to 10 carbon atoms, an alkoxy group having 1 to 10 carbon atoms, or an alkenyl group having 2 to 10 carbon atoms; and $X^{21}$ represents a hydrogen atom or a fluorine atom), the color filter is a color filter containing an organic pigment, the organic pigment having a slope parameter of 2 or less, wherein in a scattering profile analysis of the organic pigment in the color filter, the analysis including a step (A) of measuring an ultra-small angle X-ray profile of the organic pigment by ultra-small angle X-ray scattering, a step (B) of calculating a curve point on the scattering profile, a step (C) of calculating an analysis region c1 set in accordance with the curve point, and a step (D) of calculating the slope parameter in the analysis region c1.

2. The liquid crystal display device according to claim 1, wherein the organic pigment has a slope parameter of 1.5 or less.

3. The liquid crystal display device according to claim 1, wherein in the color filter, a volume fraction of particles having a particle size of 100 nm or more and 1000 nm or less relative to all particles of the organic pigment is 7% or less.

4. The liquid crystal display device according to claim 1, wherein the organic pigment has a maximum transmission wavelength of 600 nm or more and 700 nm or less.

5. The liquid crystal display device according to claim 1, wherein the organic pigment has a maximum transmission wavelength of 500 nm or more and 600 nm or less.

6. The liquid crystal display device according to claim 1, wherein the organic pigment has a maximum transmission wavelength of 400 nm or more and 500 nm or less.

7. The liquid crystal display device according to claim 1, wherein the organic pigment is dispersed in a coating film formed on a glass substrate.

8. The liquid crystal display device according to claim 1, wherein the compounds represented by the general formula (I) are compounds represented by general formula (I-a) to general formula (I-f),

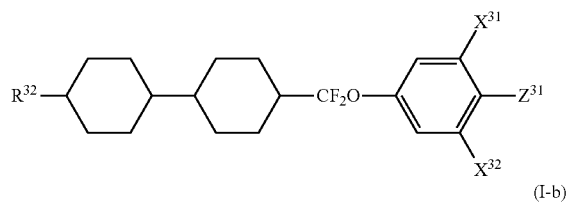

(I-a)

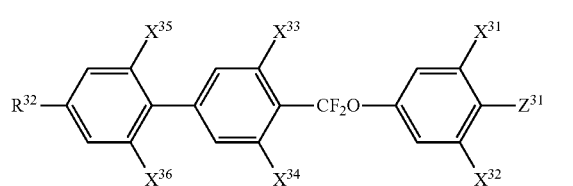

(I-b)

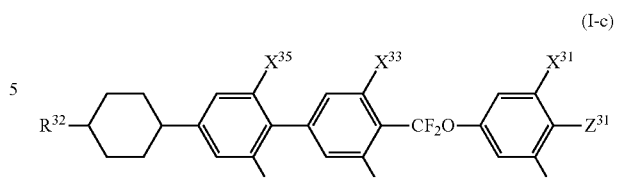

(I-c)

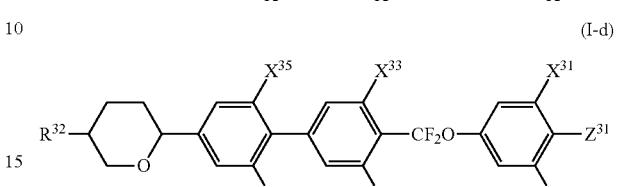

(I-d)

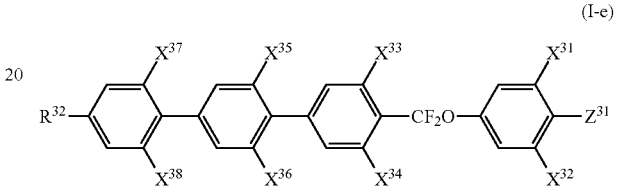

(I-e)

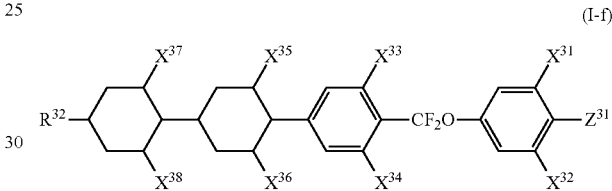

(I-f)

(in the formulae, $R^{32}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{31}$ to $X^{38}$ each independently represent a hydrogen atom or a fluorine atom; and $Z^{31}$ represents a fluorine atom, a trifluoromethoxy group, or a trifluoromethyl group).

9. The liquid crystal display device according to claim 1, wherein the liquid crystal composition layer further contains one or more compounds selected from the group consisting of compounds represented by general formula (III-a) to general formula (III-f),

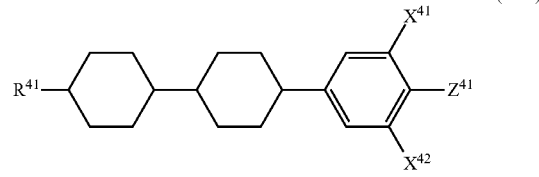

(III-a)

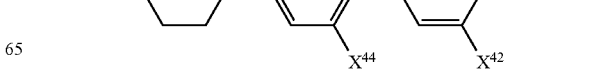

(III-b)

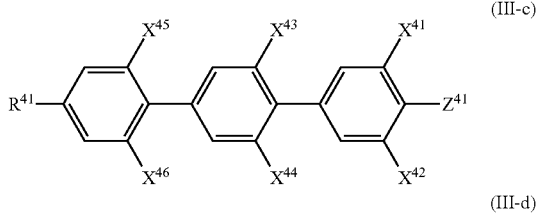

(III-c)

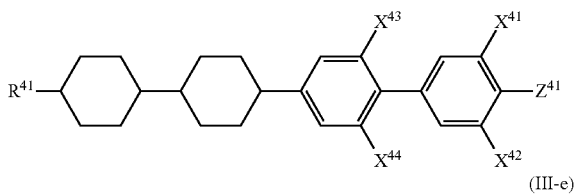

(III-d)

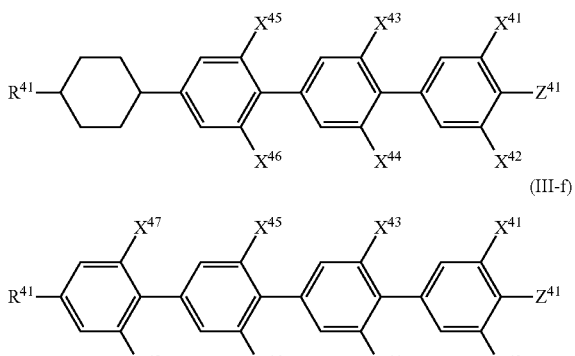

(III-e)

(III-f)

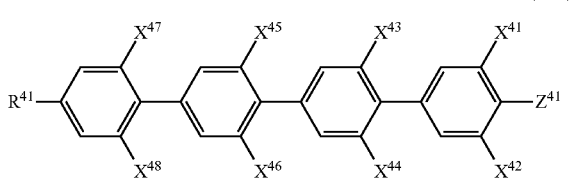

(in the formulae, $R^{41}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{41}$ to $X^{48}$ each independently represent a hydrogen atom or a fluorine atom; and $Z^{41}$ represents a fluorine atom, a trifluoromethoxy group, or a trifluoromethyl group).

10. The liquid crystal display device according to claim 1, wherein the liquid crystal composition layer contains a polymer obtained by polymerizing a liquid crystal composition containing one or more polymerizable compounds.

11. The liquid crystal display device according to claim 1, wherein the liquid crystal composition layer contains a bifunctional monomer represented by general formula (V),

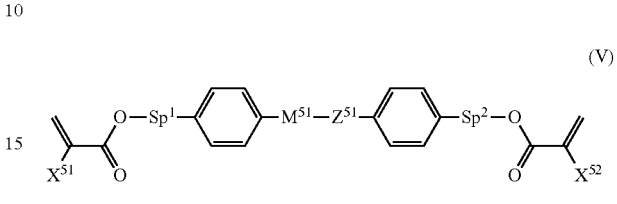

(V)

(in the formula, $X^{51}$ and $X^{52}$ each independently represent a hydrogen atom or a methyl group; $Sp^1$ and $Sp^2$ each independently represent a single bond, an alkylene group having 1 to 8 carbon atoms, or —O—$(CH_2)_s$— (where s represents an integer of 2 to 7 and the oxygen atom bonds to an aromatic ring); $Z^{51}$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— (where $Y^1$ and $Y^2$ each independently represent a fluorine atom or a hydrogen atom), —C≡C—, or a single bond; and $M^{51}$ represents a 1,4-phenylene group, a trans-1,4-cyclohexylene group, or a single bond and, in all the 1,4-phenylene groups in the formula, any of hydrogen atoms may be substituted with fluorine atoms).

\* \* \* \* \*